US008767145B1

(12) United States Patent
Zhang

(10) Patent No.: US 8,767,145 B1
(45) Date of Patent: Jul. 1, 2014

(54) DISPLAY SYSTEMS IMPLEMENTING VIEW SWITCH PANEL BASED ON REFLECTIVE POLARIZER AND LIQUID CRYSTAL

(76) Inventor: Wei Zhang, Newtown, PA (US)

(*) Notice: Subject to any disclaimer, the term of this patent is extended or adjusted under 35 U.S.C. 154(b) by 185 days.

(21) Appl. No.: 13/342,525

(22) Filed: Jan. 3, 2012

(51) Int. Cl.
*G02F 1/133536* (2006.01)
*G02F 1/13476* (2006.01)
*G02F 1/133528* (2006.01)

(52) U.S. Cl.
USPC ............ 349/96; 349/61; 349/115; 349/114; 349/77; 359/483

(58) Field of Classification Search
CPC ............ G02F 1/133536; G02F 1/1336; G02F 1/133615; G02F 2203/02; G02F 2203/64; G02F 2203/66; G02F 2001/133562; G02F 2203/09; G09G 3/36; G02B 6/0053; B32B 2457/20
USPC ............ 349/61, 96, 114, 115, 77, 62, 64, 65, 349/68, 69; 359/483
See application file for complete search history.

(56) References Cited

U.S. PATENT DOCUMENTS

| | | | |
|---|---|---|---|
| 6,525,707 B1 * | 2/2003 | Kaneko et al. ............ | 345/88 |
| 6,707,515 B1 * | 3/2004 | Ide et al. ............ | 349/74 |
| 7,643,107 B2 * | 1/2010 | Akiyama ............ | 349/83 |
| 7,817,106 B2 * | 10/2010 | Fukushima et al. ............ | 345/32 |
| 2004/0100598 A1 * | 5/2004 | Adachi et al. ............ | 349/113 |
| 2006/0215263 A1 * | 9/2006 | Mi et al. ............ | 359/486 |
| 2007/0076430 A1 * | 4/2007 | Higashiyama ............ | 362/600 |
| 2008/0068534 A1 * | 3/2008 | Meng et al. ............ | 349/70 |
| 2011/0037928 A1 * | 2/2011 | Little ............ | 349/96 |

* cited by examiner

*Primary Examiner* — Michael Caley
*Assistant Examiner* — Jia Pan

(57) ABSTRACT

In accordance with the invention, display systems have a view switch panel placed in front of displaying surface of a display to manipulate lights outputted thereby or incidence ambient lights. The view switch panel comprises a layer of reflective polarizer and a polarization steering layer comprising a layer of liquid crystal and two electrode layers sandwiching the layer of liquid crystal in between, and may further comprise a layer of second polarizer placed on the other side of the polarization steering layer than the layer of reflective polarizer. The view switch panel uses the polarization steering layer to steer polarization of pass-through lights, then direct the lights by reflection or transmission by the layer of reflective polarizer. Two display systems, dual view convertible display making displayed images selectively viewable from either side and mirror view display making selectively front surface either reflective or non-reflective, are described.

10 Claims, 19 Drawing Sheets

DISPLAY SYSTEMS IMPLEMENTING VIEW SWITCH PANEL BASED ON REFLECTIVE POLARIZER AND LIQUID CRYSTAL

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention generally relates to display, and, in particular, to display system having viewing surface control to manipulate lights.

BACKGROUND OF THE INVENTION

As price of liquid crystal display (LCD) steadily goes lower, a greater number of LCDs in various screen sizes are used on a vast variety of electronics. Many applications that were previously excluded away from having a display due to either cost or technology complexity may benefit from such cost reduction. Therefore, it is useful and meaningful to investigate various display systems based on LCD or other type flat panel display for non-conventional applications of display.

BRIEF SUMMARY OF THE INVENTION

In accordance with the invention, the disclosure discloses a view switch panel based on reflective polarizer and liquid crystal, which is to be placed in front of displaying surface of a flat panel display to manipulate lights set forth thereby or incidence ambient lights. Fundamental approach of the view switch panel is to use a layer of liquid crystal (LC) to steer polarization status of pass-through lights and then direct direction of the lights by reflection or transmission by a layer of reflective polarizer. For polarization steering, the layer of liquid crystal is sandwiched by two electrode layers to apply electrical field through the layer. A thin guidance layer for LC alignment may be presented in between each electrode layer and the LC layer. The polarization status of pass-through lights is steered by applying appropriate voltage between the two electrode layers. The layer of reflective polarizer, typically made in form of thin film, is placed adjacent one layer of the two electrode layers. If incoming lights entering the view switch panel is not linearly polarized, a layer of second polarizer may be placed adjacent the other layer of the two electrode layers to make the incoming lights become linearly polarized. The layer of second polarizer may be either absorptive polarizer or reflective polarizer. Unless reflective polarizer is desired for specific reason in system design, absorptive polarizer is preferred to be in use as the layer of second polarizer for a variety of advantages, such as low cost and avoiding undesired internal reflection. When placed in front of a display, the view switch panel may direct output lights of the display going forward or backward by steering polarization status of the lights. Furthermore, when placed in front of a display, the view switch panel may turn front surface of the system into a mirror-like surface, in which ambient light is configured to be reflected by the layer of reflective polarizer.

In accordance with the invention, a display system implementing the view switch panel, dual view convertible display, is disclosed to have the view switch panel placed in front of displaying surface of a display with the layer of liquid crystal of the view switch panel adjacent the display in closer manner than the layer of reflective polarizer thereof. In this case, output lights of the display goes through the layer of liquid crystal before meeting with the layer of reflective polarizer. With predetermined control voltages applied on the two electrode layers sandwiching the layer of liquid crystal, the lights may be either reflected backward by or transmits forward through the layer of reflective polarizer. When the display itself is transparent to passing through lights, which means no blocking to the reflected lights, the output lights may be seen from back side of the display. This allows viewing side of the display system to be changed between front side and rear side by applying respective predetermined control voltages on the two electrode layers. Thus, the display system may have its displayed image viewable from front side or rear side upon preference of using. With predetermined control voltages applied on the two electrode layers, it is also possible to partially reflect the lights backward and partially permit the lights going through forward. In such scenario, the display system has its both front and rear sides become viewable to displayed images. One application example of the dual view convertible display is to be used as foldable display screen for a portable computing device, for example a portable computer, which may, with onboard keyboard and computer-mice-like pointing device, work like a laptop computer by selectively making displayed images viewable from bottom surface of the display screen when the display screen is opened upward, and, with a touch panel incorporated thereon, operate like a tablet computer by selectively making displayed images viewable from top surface of the display screen when the display screen is folded down, for example similar as Apple iPad, Android Tablet or the like.

In accordance with the invention, another display system implementing the view switch panel, mirror view display, is disclosed to have the view switch panel, having a layer of second polarizer presented in the assembly of the view switch panel, placed in front of displaying surface of a display with the layer of reflective polarizer of the view switch panel adjacent the display in closer manner than the layer of second polarizer. In the display system, the layer of second polarizer constitutes front viewing side of the display system and is made of absorptive polarizer. Thus, the layer of second polarizer of the view switch panel may be also referred as the layer of absorptive polarizer within descriptions regarding this display system. The view switch panel may be configured to reflect ambient lights back by the layer of reflective polarizer thereof to make front viewing of the display system act like mirror when the mirror-like surface function is desired in using, or let ambient light go through to avoid surface reflection when the mirror-like surface function is not desired in using. Typically, when the display behind the view switch panel is turned on to display images, surface reflection of ambient light is better to be avoided in order for clearer view of the displayed images. When the display is turned off, "mirror-like" surface on front of the display system may be desired to make front view of the display system like mirror. One application example of the mirror view display is to be used as rear view assembly for automobile, which can act as a normal rear view mirror for daylight and display night-vision camera captured images for night or low light environments.

In accordance with the invention, above description of summary is best effort to fulfill purpose or need of Brief Summary of Invention section and should not be used for purpose to reduce or be against merits of the invention as a whole. Furthermore, not to be limited by this summary section, all patentable rights embodied in or derived from the complete disclosure are reserved without prejudice.

BRIEF DESCRIPTION OF THE SEVERAL VIEWS OF THE DRAWINGS

It should be understood that the brief description of the several views of the drawings is only for the purpose of presenting a concise reference to accompanying drawings and should not be inferred to have any suggestion to limit or reduce the scope of invention. Furthermore, the concepts and embodiments of the invention explicitly or implicitly shown in the drawings are only possibly understood accordingly by referring to following detailed descriptions upon illustrative showings of the drawings. For illustrative purpose, the drawings are not in scale. In the drawings:

FIG. 2A illustrates transmission mode of the operation and FIG. 2B illustrates reflection mode of the operation.

FIG. 4A illustrates case that a layer (21) of second polarizer is present in the assembly of the view switch panel. In accordance with the invention, FIG. 4B illustrates case that no layer (21) of second polarizer is present in the assembly of the view switch panel, in which lights outputted by the flat panel display is linearly polarized.

FIG. 5A illustrates case that a layer (21) of second polarizer is present in the assembly of the view switch panel, and, FIG. 5B illustrates case that no layer (21) of second polarizer is present in the assembly of the view switch panel since output lights of liquid crystal display is already linearly polarized.

In accordance with the invention, FIG. 7A illustrates scenario that the display screen is folded down and FIG. 7B illustrates scenario that the display screen is opened upward.

In accordance with the invention.

DETAILED DESCRIPTION

Figure 1:
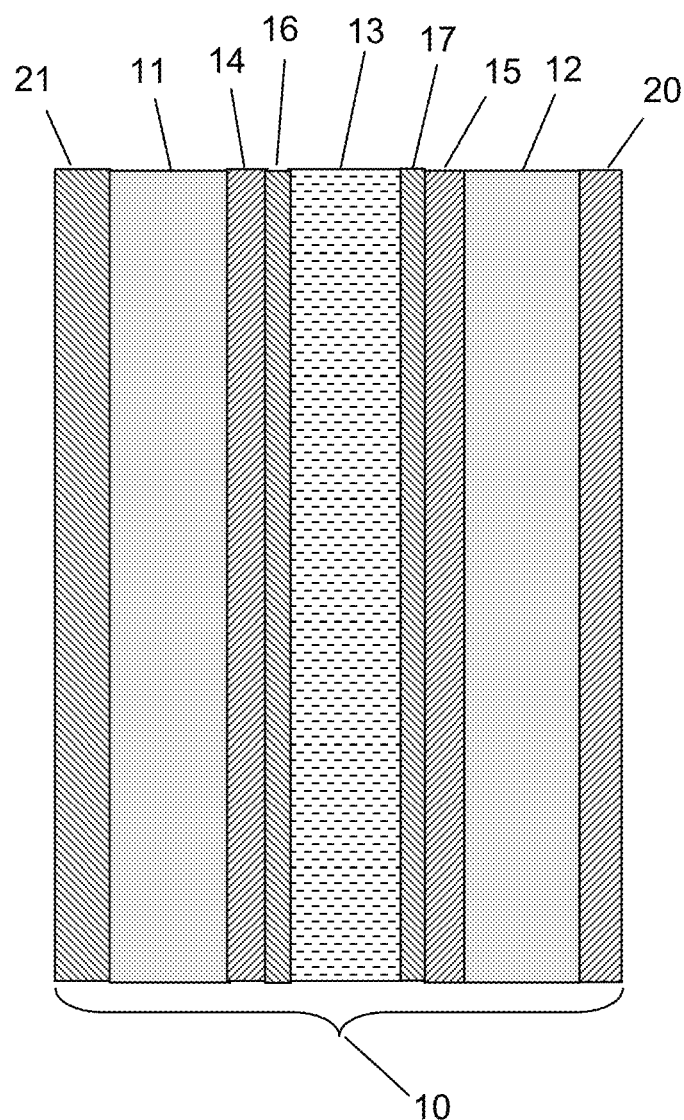
FIG. 1 is a cross-sectional drawing to illustratively show an embodiment of the view switch panel based on reflective polarizer and liquid crystal in accordance with the invention, which is to be placed in front of a display to manipulate lights outputted by the display or ambient incidence lights.

In accordance with the invention, one embodiment of a view switch panel based on reflective polarizer and liquid crystal, which is to be placed in front of displaying surface of a flat panel display to manipulate lights set forth thereby or incoming ambient lights, is illustratively shown in the drawing of FIG. 1. In the assembly of view switch panel 10 illustratively shown in the drawing, a layer 20 of reflective polarizer in form of thin film is placed on one side of a layer 13 of liquid crystal (LC). To control polarization steering through layer 13 of LC, two electrode layers 14 and 15 have layer 13 sandwiched in between. A voltage applied between the two electrode layers generates an internal electrical field inside layer 13 of LC, which, in turn, causing polarization status of pass-through lights varying accordingly. For LC alignment purpose, thin guidance layers 16 and 17 may be respectively placed in between layer 13 of LC and the each electrode layer. It is to be recognized that the electrode layer may have its surface patterned for guiding LC alignment, thus rendering existence of the guidance layer unnecessary. For convenience of making, electrode layers 14 and 15 are made on transparent substrates 11 and 12 respectively by using appropriate ways of making. For light passing purpose, electrode layers 14 and 15 are substantially made of transparent conductive materials, for example ITO (indium-tin-oxide) or the like. Layer 13 of liquid crystal and electrode layers 14 and 15, and, if existing, guidance layers 16 and 17 as well, constitute a polarization steering layer, which changes polarization status of pass-through light with various voltages applied between the electrode layers. Layer 20 of reflective polarizer may be either made on the other side of substrate 12 than where electrode layer 15 is made, or produced separately and attached therewith. Layer 20 of reflective polarizer may be any type of reflective polarizer that may be made in form of layer or thin film and work in polarization-beam-splitting way that reflect lights of one polarization direction and pass through lights of the orthogonal polarization direction. For example, layer 20 of reflective polarizer may be a wire grid polarizer having pitch of metallic wires much smaller than wavelength of visible lights, which is to be described with more details later in this disclosure. The assembly of view switch panel 10 may further have a layer 21 of second polarizer placed on the side of the polarization steering layer opposite to where layer 20 of reflective polarizer is placed. In such way, layer 20 and layer 21 sandwich the polarization steering layer in between. Layer 21 of second polarizer may be absorptive polarizer or reflective polarizer. Unless specifically needed by application to be reflective polarizer, layer 21 of second polarizer prefers to be absorptive polarizer for advantages of low cost of making and no undesired internal reflection incurred. For this reason, layer 21 of second polarizer of the view switch panel may also be referred as layer of absorptive polarizer assuming that absorptive polarizer is normally used for the layer. It should be recognized that, even when being referred as layer of absorptive polarizer, layer 21 may be a layer of reflective polarizer for specific need of application without departure from merits and spirits of the teaching herein. Layer 21 of second polarizer is necessary when incoming lights is not linearly polarized or when incoming linearly polarized lights has an undesired polarization for the view switch panel working in expected way. Normally, pass-through polarization directions of layer 20 and layer 21 are arranged to be orthogonal each other. However, they may be arranged to form a different angle in between without departure from merits and spirits of teaching herein if system design desires to do so and takes necessary measures accordingly. In general, the view switch panel can be voltage controlled to permit incoming lights passing through or reflect incoming lights backward by the layer of reflective polarizer, or cause partial transmission and partial reflection of incoming lights. Regarding usefulness, the view switch panel may not need the function of partial transmission and partial reflection. In such case, only on or off of a predetermined voltage applied on the view switch panel are needed to switch between the passing through and the backward reflection. Thus simple control circuit for the voltage on or off is sufficient to control working of the view switch panel, which indicates low cost of making the panel and very easy control for using.

Figure 2A:
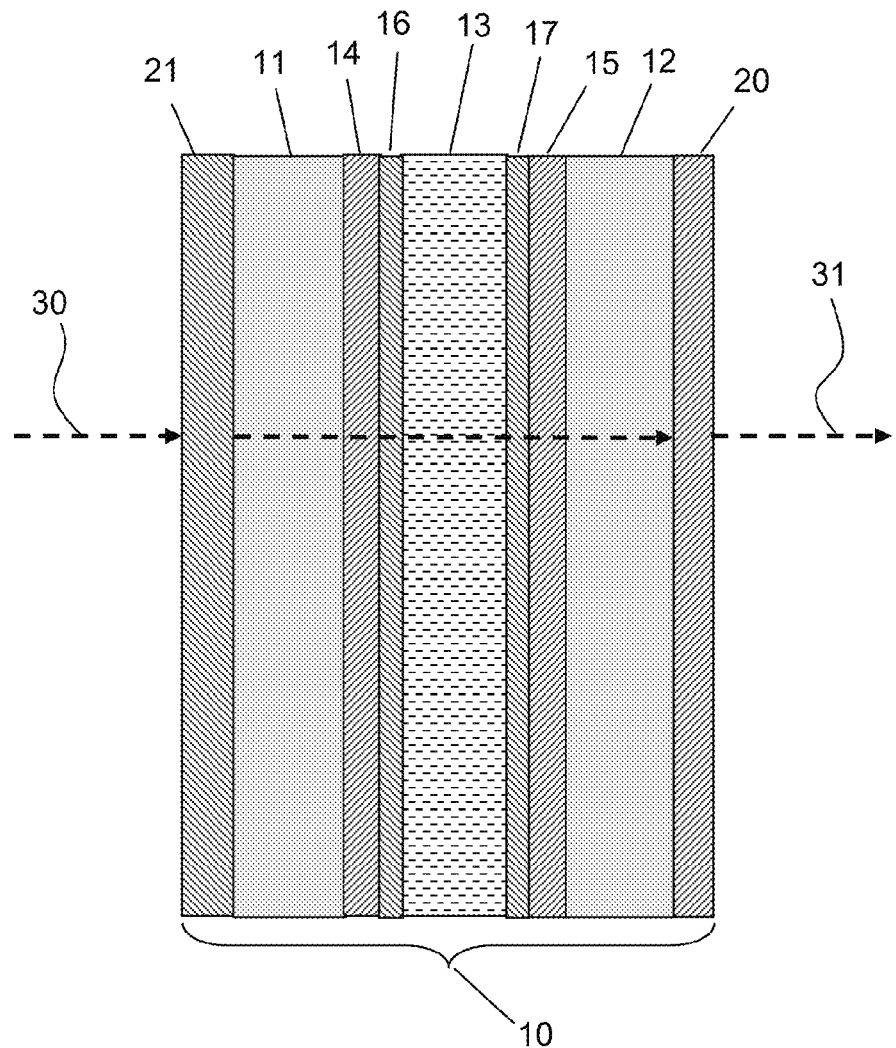
FIGS. 2A and 2B respectively illustrates two operational modes of the embodiment as illustratively shown in FIG. 1.
Figure 2B:
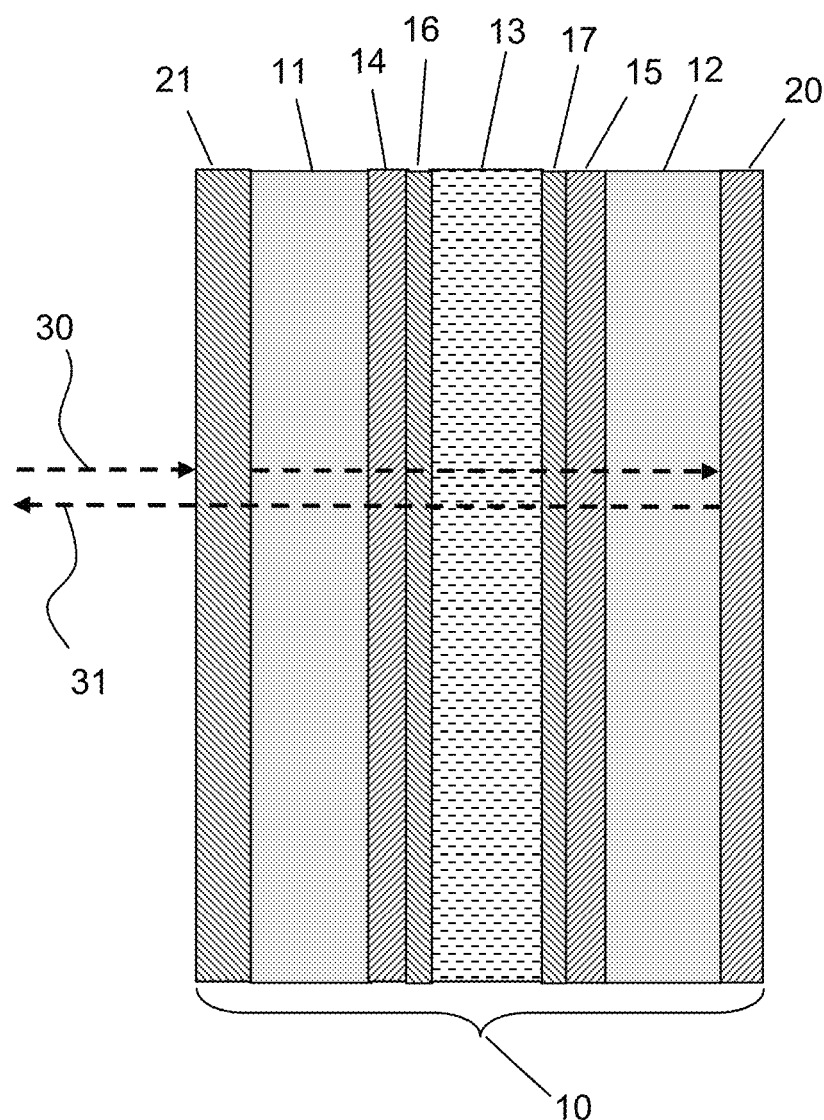

FIGS. 2A and 2B respectively illustrates two operational modes, transmission mode and reflection mode, of the view switch panel in accordance with the invention. In these illustrations, layer 21 of absorptive polarizer is presented in the assembly of view switch panel 10 since non-linearly-polarized lights is assumed to be incoming lights 30. One operational mode, transmission mode hereof, as illustrated in the drawing of FIG. 2A, is configured to permit lights to pass through the view switch panel. First, incoming lights 30 coming from left side of the assembly passes through layer 21 of absorptive polarizer to become linearly polarized lights having polarization in consistence with pass-through polarization direction of the layer. The other polarization portion of lights 30 is absorbed by layer 21. If layer 21 is of reflective polarizer, the other polarization portion is reflected back instead of being absorbed thereby. Then, linearly polarized lights 30 go through the polarization steering layer, which, according to showing of the drawing from left to right, comprises electrode layer 14, guidance layer 16, layer 13 of liquid crystal, guidance layer 17, and electrode layer 15. In the scenario, the polarization steering layer is controlled to have polarization of pass-through lights 30 in substantially parallel to pass-through polarization direction of layer 20 of reflective polarizer. Thus, after going through the polarization steering layer, lights 30 passes through layer 20 of reflective polarizer with no or negligible reflection encountered. Numeral 31 represents output lights of lights 30 after passing through layer 20, which could be viewable from right side of the assembly, opposite side to incoming side of lights 30. If lights 30, in real application, are displayed image of a display placed on left side of the assembly, the displayed image, represented by lights 31 after passing through the view switch panel, is viewable from right side of the assembly. If lights 30 from the display is not linearly polarized, output displayed image is darken primarily due to polarization absorption by layer 21. If lights 30 from the display is linearly polarized, which is common for liquid crystal display (LCD), polarization direction of layer 21 may be intentionally disposed to be substantially parallel to the polarization direction of lights 30, thus rendering much less loss on light intensity of outputted image. One example of polarization configuration for the assembly of view switch panel 10 may be as described following: polarization direction of layer 20 is orthogonal or perpendicular to polarization direction of layer 21; guiding directions of guidance layer 16 and guidance layer 17, which are for aligning molecular of liquid crystal in layer 13, are respectively in consistence with polarization directions of layer 21 and layer 20. The thickness of layer 13 of liquid crystal is predetermined to rotate polarization of the lights going through the layer from polarization direction of layer 21 to polarization direction of layer 20. When zero or none voltage is applied between two electrode layers 14 and 15, lights is set to pass from left to right through the assembly. When a predetermined voltage is applied between two electrode layers 14 and 15, light is set to be reflected backward by layer 20 of reflective polarizer, which is the scenario of another operational mode to be described in immediately following paragraph.

Another operational mode, reflection mode hereof, as illustrated in the drawing of FIG. 2B, is configured to reflect lights backward by the layer of reflective polarizer. First, incoming lights 30 coming from left side of the assembly passes through layer 21 of absorptive polarizer to become linearly polarized lights having polarization in consistence with pass-through polarization direction of the layer. The other polarization portion of lights 30 is absorbed by layer 21. If layer 21 is of reflective polarizer, the other polarization portion is reflected back instead of being absorbed thereby. Then, linearly polarized lights 30 go through the polarization steering layer, which, according to showing of the drawing from left to right, comprises electrode layer 14, guidance layer 16, layer 13 of liquid crystal, guidance layer 17, and electrode layer 15. In the scenario, the polarization steering layer is controlled to have polarization of pass-through lights 30 in substantially perpendicular or orthogonal to pass-through polarization direction of layer 20 of reflective polarizer. Thus, after going through the polarization steering layer, lights 30 is reflected backward by layer 20 of reflective polarizer with no or negligible transmission. After that, the reflected light goes through the polarization steering layer. Due to optical path invertible, after passing through the polarization steering layer, the reflected lights has its polarization direction in parallel to the polarization direction of layer 21, thus passing through layer 21 without obstruction. Numeral 31 represents output lights of the reflected lights after passing through layer 21, which could be viewable from left side of the assembly, the same side as incoming side of lights 30. In this scenario, incoming lights 30 is reflected backward to be viewable.

Figure 3:
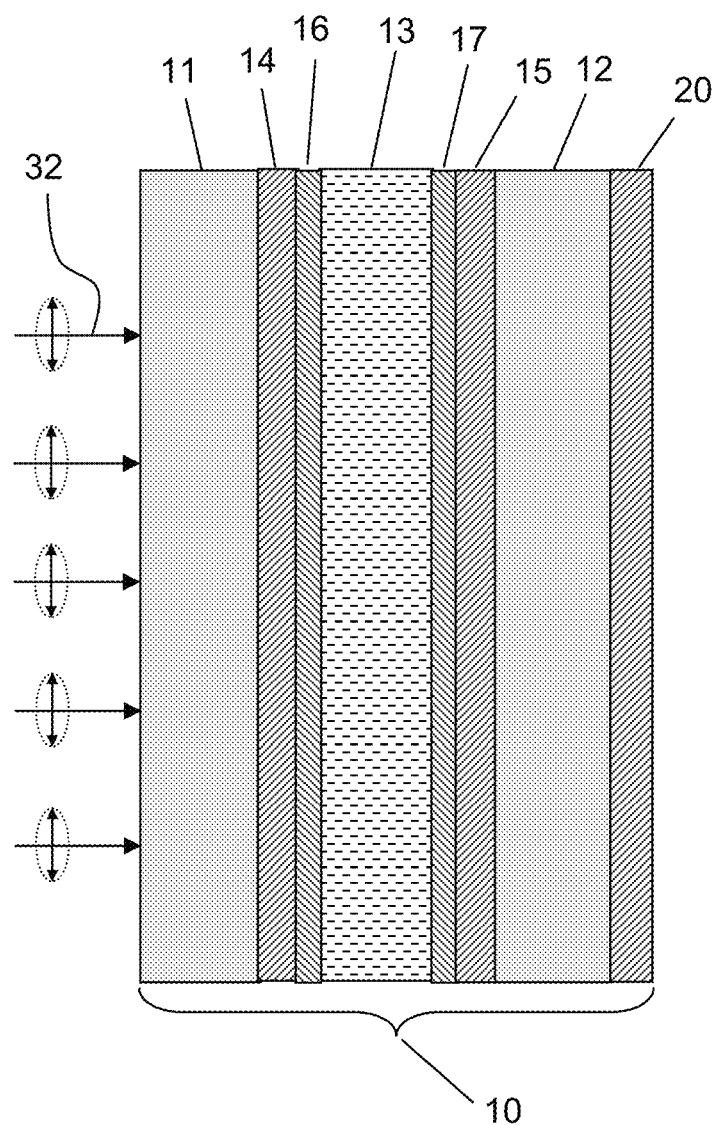
FIG. 3 is a cross-sectional drawing to illustratively show another embodiment of the view switch panel based on reflective polarizer and liquid crystal in accordance with the invention, which is for case that incoming lights is linearly polarized. In the drawing, the assembly of the view switch panel has no layer (21) of second polarizer presented therein because incoming lights is already linearly polarized.

If incoming lights is linearly polarized, as mentioned previously in this disclosure, later 21 of second polarizer may no longer be necessary for the view switch panel to work in expected way. For such case, another embodiment of the view switch panel in accordance with the invention is illustratively shown in the drawing of FIG. 3. In accordance with the drawing of FIG. 3, the assembly of view switch panel 10 has no layer 21 of second polarizer presented, comparing with the assembly illustratively shown in FIG. 1. In the case, incoming lights 32 is linearly polarized as shown in the drawing. Incoming lights 32 incidences from left side of the assembly, which is opposite to the side where layer 20 of reflective polarized is placed. The polarization steering layer, which, according to showing of the drawing from left to right, comprises electrode layer 14, guidance layer 16, layer 13 of liquid crystal, guidance layer 17, and electrode layer 15, may be voltage controlled to set polarization direction of lights 32 after going through the polarization steering layer either in substantially parallel or in substantially perpendicular to pass-through polarization direction of layer 21 of reflective polarizer. Thus, lights 32 may be directed under voltage control either passing through the view switch panel or being reflected backward by the view switch panel. One example of polarization configuration for the assembly of view switch panel 10 may be as described following: polarization direction of layer 20 is orthogonal or perpendicular to polarization direction of incoming lights 32; guiding directions of guidance layer 16 and guidance layer 17, which are for aligning molecular of liquid crystal in layer 13, are respectively in consistence with polarization directions of incoming lights 32 and layer 20. The thickness of layer 13 of liquid crystal is predetermined to rotate polarization of the incoming lights, after going through the layer, to pass-through polarization direction of layer 20. When zero or none voltage is applied between two electrode layers 14 and 15, lights is set to pass from left to right through the assembly. When a predetermined voltage is applied between two electrode layers 14 and 15, light is set to be reflected backward by layer 20 of reflective polarizer, which then goes through the polarization steering layer without obstruction encountered. Therefore, the view switch panel may be voltage controlled to permit the incoming lights viewable from either side. Of course, the view switch panel may also be voltage controlled to have partial transmission and partial reflection, thus permitting the incoming lights viewable from both sides.

It is to be recognized that, for intended use disclosed in this disclosure, the electrode layers of the view switch panel may be either plain like continuous films or patterned to form multi regions. With multi region division, the view switch panel may have each region working at different operational modes. For example, the view switch panel may set one region working at transmission mode and another region working at reflection mode. When it is placed in front of a display, it may permit a region of display screen to be viewable from front side and another region thereof to be viewable from back side. With limited number of the divided regions on the view switch panel, controls of applying corresponding voltage on each divided region are still relatively simple and cheap to make comparing with pixel matrix control of flat panel display. Although not preferred, it should be recognized that, the electrode layers of the view switch panel may be patterned to form pixel matrix similar as image pixels of liquid crystal display, which thus incurs similar cost of making and driving circuit complexity as liquid crystal display with no foreseeable advantage for purpose hereof.

Wire grid polarizer is made of a vast number of metallic wires arranged in periodic spacing between one and another. Typical pitch of the metallic wires is much less than wavelength of working lights. Thus, wire grid polarizer for wavelength of light is also referred as subwavelength optical polarizer. When lights incidence on wire grid polarizer, lights of polarization perpendicular to the metallic wires can pass through freely. Lights of polarization parallel to the metallic wires is reflected back. Thus, wire grid polarizer splits incidence beam of lights into a forward beam of polarization perpendicular to the wires and a backward beam of polarization parallel to the wires. Most wire grid polarizer made previously were for infrared light spectrum because it is relatively easier to make pitch of the metallic wires suitable for infrared light. To make wire grid polarizer suitable for visible light, the metallic wires should normally have a pitch 150 nm or less with duty cycle (ratio of wire width over pitch) 50% or less and metal thickness 20 nm or greater. For more desirable performance, the metallic wires may have pitch 100 nm or less with wire width 50 nm or less and metal thickness 40 nm or greater. As semiconductor processing techniques steadily makes progress to shrink feature size of patterning capability, making pitch of the metallic wires suitable for visible light has become no longer unpractical. For example, Intel has produced CPU chips with critical feature size 32 nm and is pushing promisingly to get next level of critical feature size 22 nm. With DUV (193 nm excimer laser) optical stepper and immersion exposure technique currently used by Intel and other mainstream chip makers, there is no problem to make the metallic wires of pitch less than 100 nm and wire width less than 30 nm. Since chip production lines of these chip makers have become very stable after running many years for CPU chip making, cost of adapting any such production line for making the metallic wires of wire grid polarizer is acceptable if the chip maker decides to do so. From technology aspect, making the metallic wires with pitch and width optimized for visible spectrum is feasible with currently state-of-art semiconductor processing. A possible standing obstacle may be cost issue. However, nanoimprint lithography having sub-10 nm feature resolution may be used to produce the metallic wires at very low cost once a master template is produced with optical stepper or other patterning technique such as electron beam lithography (EBL), interference lithography (also named as holographic lithography), x-ray lithography, extreme UV lithography or self-assembly lithography. Nanoimprint lithography (NIL) replicates nanoscale features on a master template onto a substrate by mechanical deformation on polymer resist applied on the substrate and subsequent etching. NIL is capable of reproducing nanoscale feature as small as less than 10 nm over large area at fractional cost of other nanolithography. Commercial tools and related processes and materials for nanoimprint lithography are provided by several companies including Molecular Imprints Inc. in Austin, Tex., Nanonex Corp. in Monmouth Junction, N.J., and Obducat in Sweden. For purpose to prove that wire grid polarizer for visible spectrum is within making capability of state-of-art semiconductor processing, a technical article in title of "Fabrication of a 50 nm half-pitch wire grid polarizer using nanoimprint lithography" authored by Seh-Won Ahn, Ki-Dong Lee, et al and published on Nanotechnology Volume 16 Number 9 in Year 2005 is referred as an example of the proof. In the article, fabricated wire grid polarizer was reported to achieve transmission of 85% at visible spectrum of wavelength 450 nm with polarization extinction ratio over 2000. It is to be particularly pointed out that wire grid polarizer normally works better for longer wavelength, which means the above performance of the wire grid polarizer as reported in the article should be equally or better achievable for whole visible spectrum since 450 nm is at shorter wavelength end of visible spectrum. Furthermore, because of working nature of wire grid polarizer, its performance is broadband, which means a relatively uniform performance across a broad range of wavelengths. Such broadband performance of wire grid polarizer makes it desirable to application on display.

In accordance with the invention, a display system implementing the view switch panel, dual view convertible display, has a view switch panel in accordance with the invention placed in front of displaying surface of a flat panel display. The dual view convertible display is controllable to select displayed images viewable from either front side or rear side. In order for viewing from rear side of the display system, the flat panel display should allow incoming lights passing through full thickness of its body panel, which means no significant light blocking layer used in the design of the display panel. For example, the design of liquid crystal display may not have backlight reflector presented on back side of backlight layer for reflecting backside leaking lights from the backlight layer, thus preferring design of backlight layer having less backside light leaking. For another example, the design of OLED (Organic Light Emitting Diode) display may have OLED built on transparent substrate. For another example, the design of LED matrix display (Array of LEDs made monolithically to form display matrix) may have LED components fabricated on transparent semiconductor substrate such as Sapphire or SiC and assembled in array on transparent backplate. In the dual view convertible display, the layer of reflective polarizer of the view switch panel constitutes front viewing surface of the display system, which means the other side of the view switch panel than the side of the layer of reflective polarizer is adjacent the displaying surface of the display. In operation, when the view switch panel is set at transmission mode that permits lights set forth from the displaying surface to pass through, images on the displaying surface of the display is viewable from front side of the display system. When the view switch panel is set at reflection mode that reflects lights set forth from the displaying surface backward to go through the body panel of the display, images on the displaying surface of the display is viewable from back side of the display system. Therefore, the display system may have its viewing side changed from front side to back side or vice versus, thus referred as dual view convertible display. The view switch panel may be also set at mode of partial transmission and partial reflection, which in turn makes displayed images viewable from both front side and back side with sacrifice of brightness on each side.

Figure 4A:
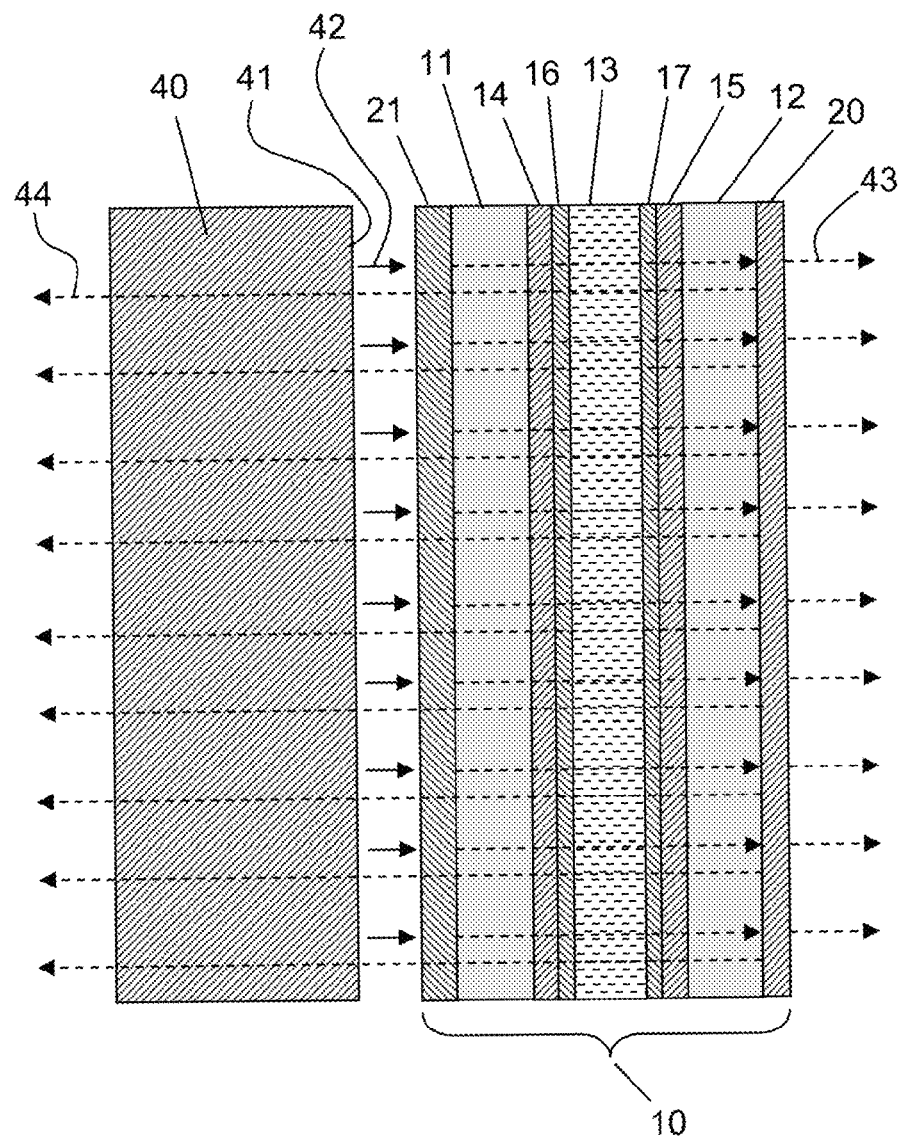
FIGS. 4A and 4B are cross-sectional drawings to illustratively show a display system, dual view convertible display, having a view switch panel in accordance with the invention placed in front of displaying surface of a flat panel display, which permits images displayed by the flat panel display being viewable from either side of the display system upon selective controls of the view switch panel. In accordance with the invention.
Figure 4B:
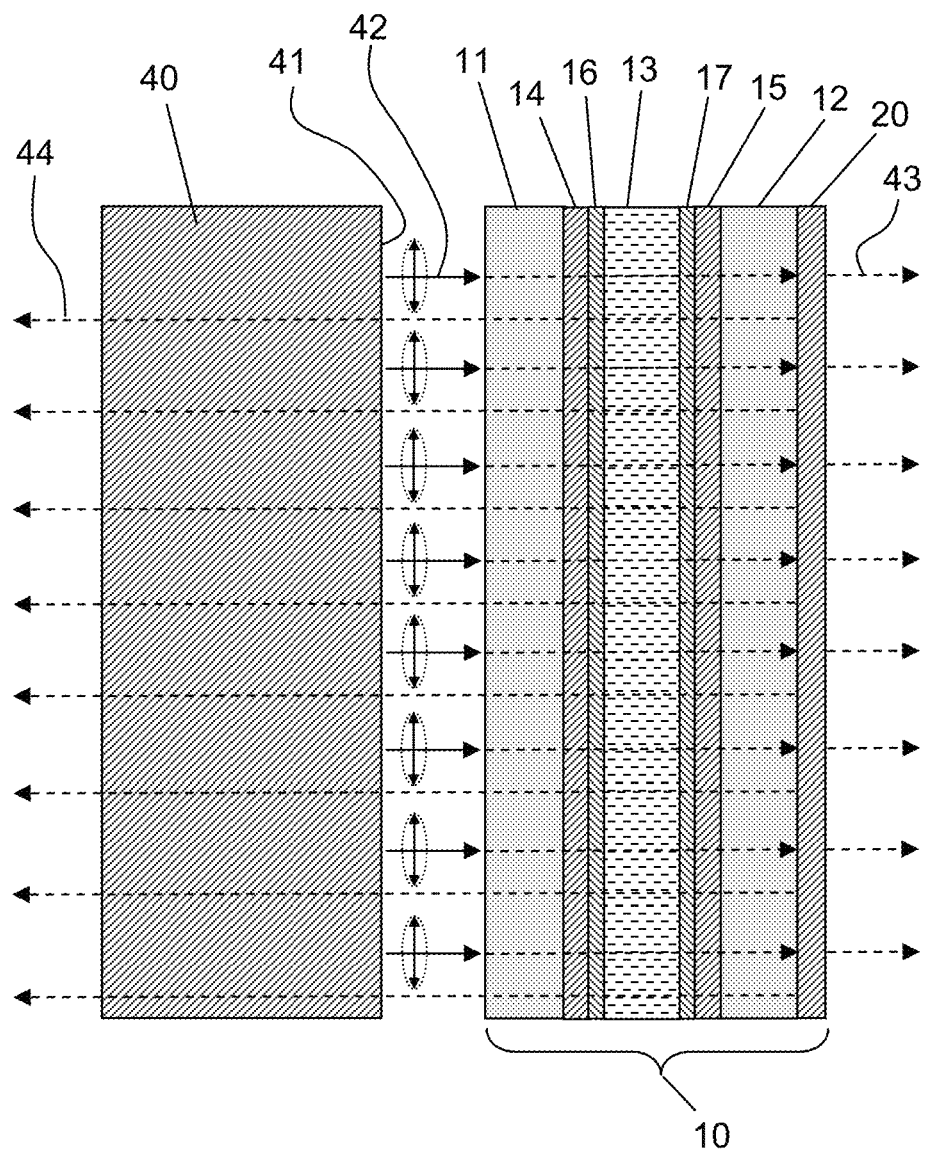

In accordance with the invention, the dual view convertible display may be understood better by referring to illustrations shown in the drawings of FIGS. 4A and 4B. As illustrative shown by the drawings of FIG. 4A and FIG. 4B, the dual view convertible display has view switch panel 10 placed in front of a flat panel display 40. For purpose of clearer illustration, the drawing shows a distance between panel 10 and display 40, which should not be taken as any suggestion or teaching that panel 10 and display 40 are placed in separation. In engineering implementation of the display system, panel 10 and display 40 may be placed either in contact or in proximity unless intended purpose hereof is realized. The drawing of FIG. 4A illustrates that layer 21 of second polarizer is present in the assembly of view switch panel 10. If possible and desired by system design, layer 21 of second polarizer may be used as one functional layer for display 40, thus possible to save some cost of making. In the drawing of FIG. 4A, lights 42 set froth from displaying surface 41 of display 40 goes through layer 21 and the polarization steering layer comprising layer 14, 16, 13, 17 and 15 as illustratively shown. At interface of layer 20 of reflective polarizer, lights 42 may be controlled to pass through layer 20 to form front output lights 43 or controlled to reflect backward to go through the polarization steering layer and layer 21 again. Because display 40 is transparent to incoming lights, the reflected lights can go through body thickness of the display and output from back side of the display to form back output lights 44. In operational mode of partial transmission and partial reflection for panel 10, both front output lights 43 and back output lights 44 are present. As mentioned previously in this disclosure, if output lights of the display is linearly polarized, layer 21 of second polarizer is not necessary to be present in the assembly of view switch panel 10. FIG. 4B illustrates the case that layer 21 of second polarizer is not present in the assembly of view switch panel 10. In the illustration, lights 42 set forth from displaying surface 41 is linearly polarized. The lights go through the polarization steering layer and, then, either passing through layer 21 of reflective polarizer or subject to reflection by layer 21 depending upon control voltage applied on the polarization steering layer. The lights passing through form font output lights 43, which represents displayed images viewable from front side. The lights reflected, after exiting back side of the display system, form back output lights 44, which represents displayed image viewable from back side. Display 40 may be any type of flat panel display that is adapted to permit incoming light passing through its body. For example, liquid crystal display having transparent backlight layer without having backlight reflector placed on its backside can permit light passing through full thickness of its assembly body. OLED (Organic LED) display fabricated on transparent substrate such as Quartz, glass or transparent polymer may meet the need as well. For the need, LED matrix display may have LED matrix built on transparent support substrate and have each LED components fabricated on transparent semiconductor substrate such as SiC or Sapphire. For the need, PDP (Plasma Display Panel) display may have pixels of plasma cells formed on glass or quartz substrates and use transparent conductive material to make control circuitry to become transparent. Among possible types of the flat panel displays, liquid crystal display having transparent backlight layer is considered to be most preferable type for display 40.

Figure 5A:
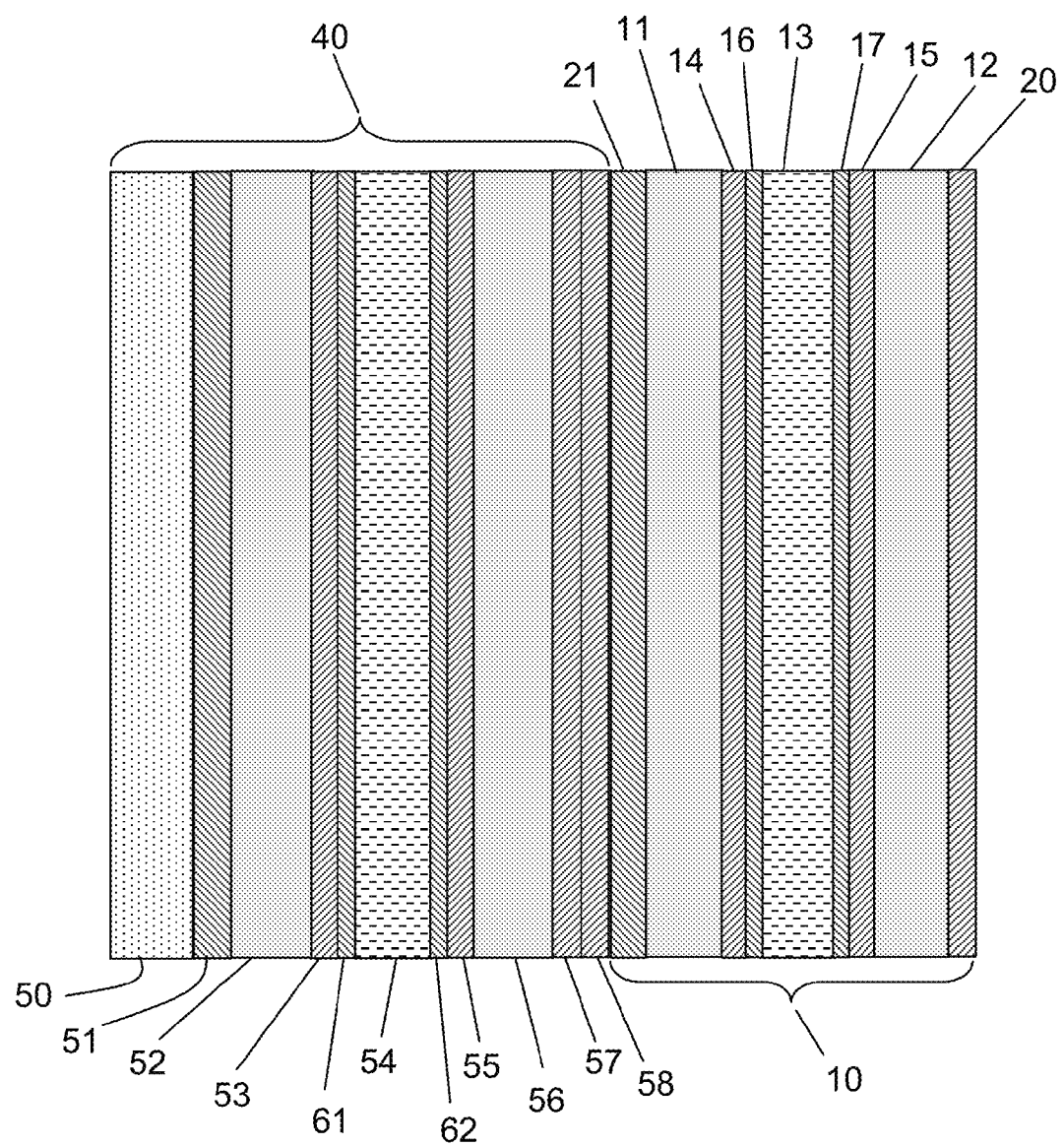
FIGS. 5A and 5B are cross-sectional drawings to illustratively show an example of the dual view convertible display as illustratively shown in the drawing of FIGS. 4A and 4B, which uses liquid crystal display as the display for the display system. In accordance with the invention.
Figure 5B:
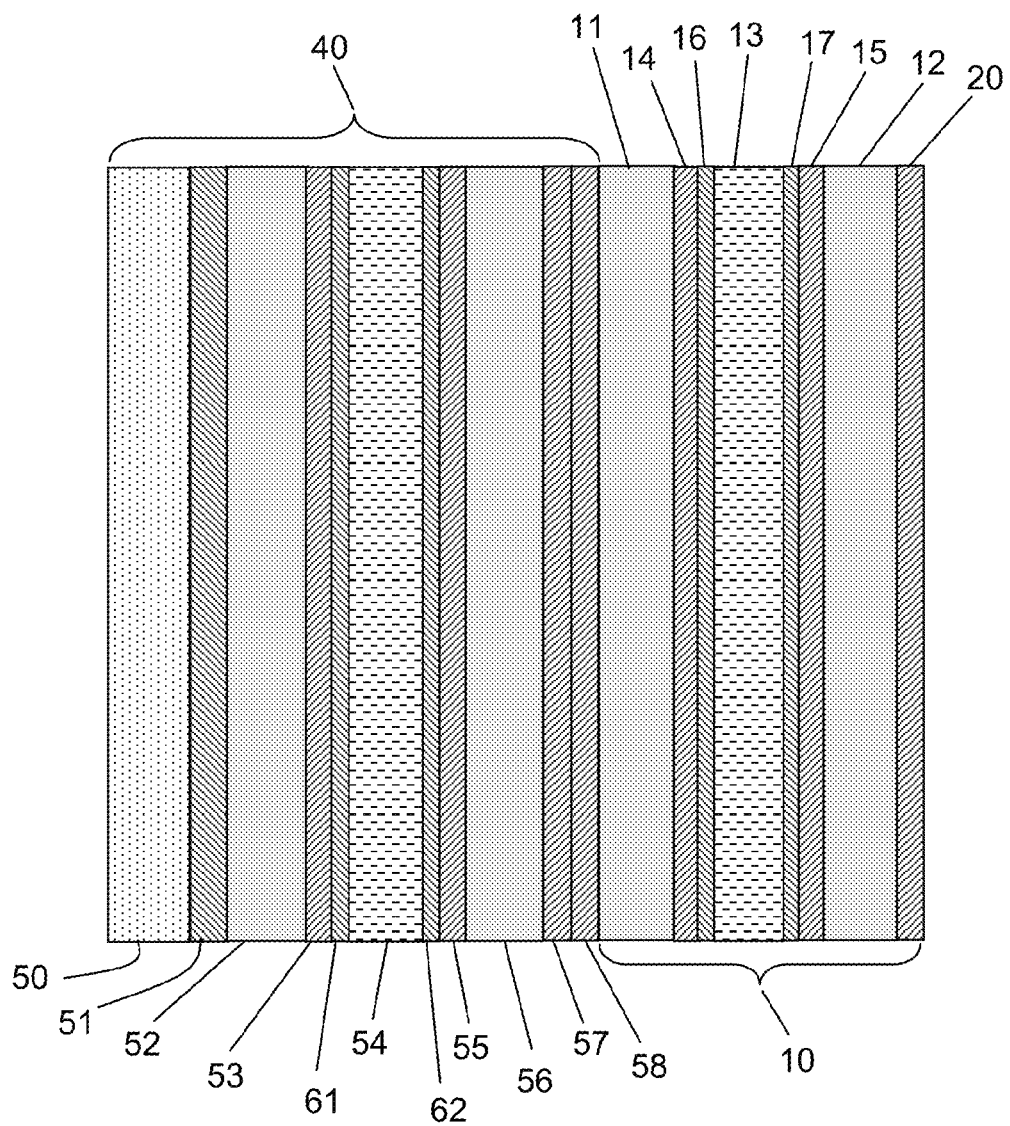
Figure 6A:
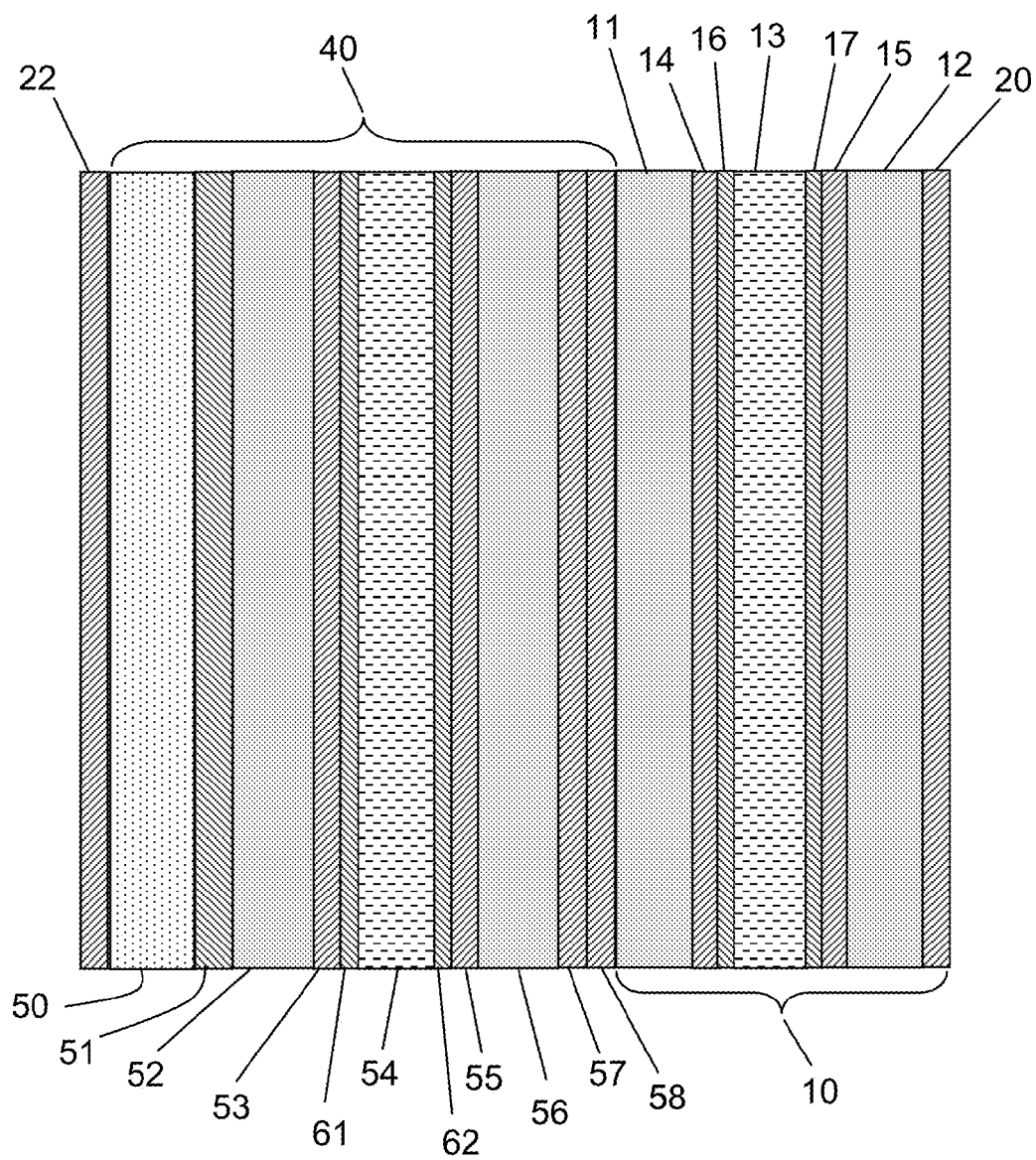
FIG. 6A is a cross-sectional drawing to illustrate that the example as illustratively shown in the drawing of FIGS. 5A and 5B further comprises a layer (22) of absorptive polarizer placed on backside of the backlight layer (50) for reducing backside light leaking of the backlight layer.
Figure 6B:
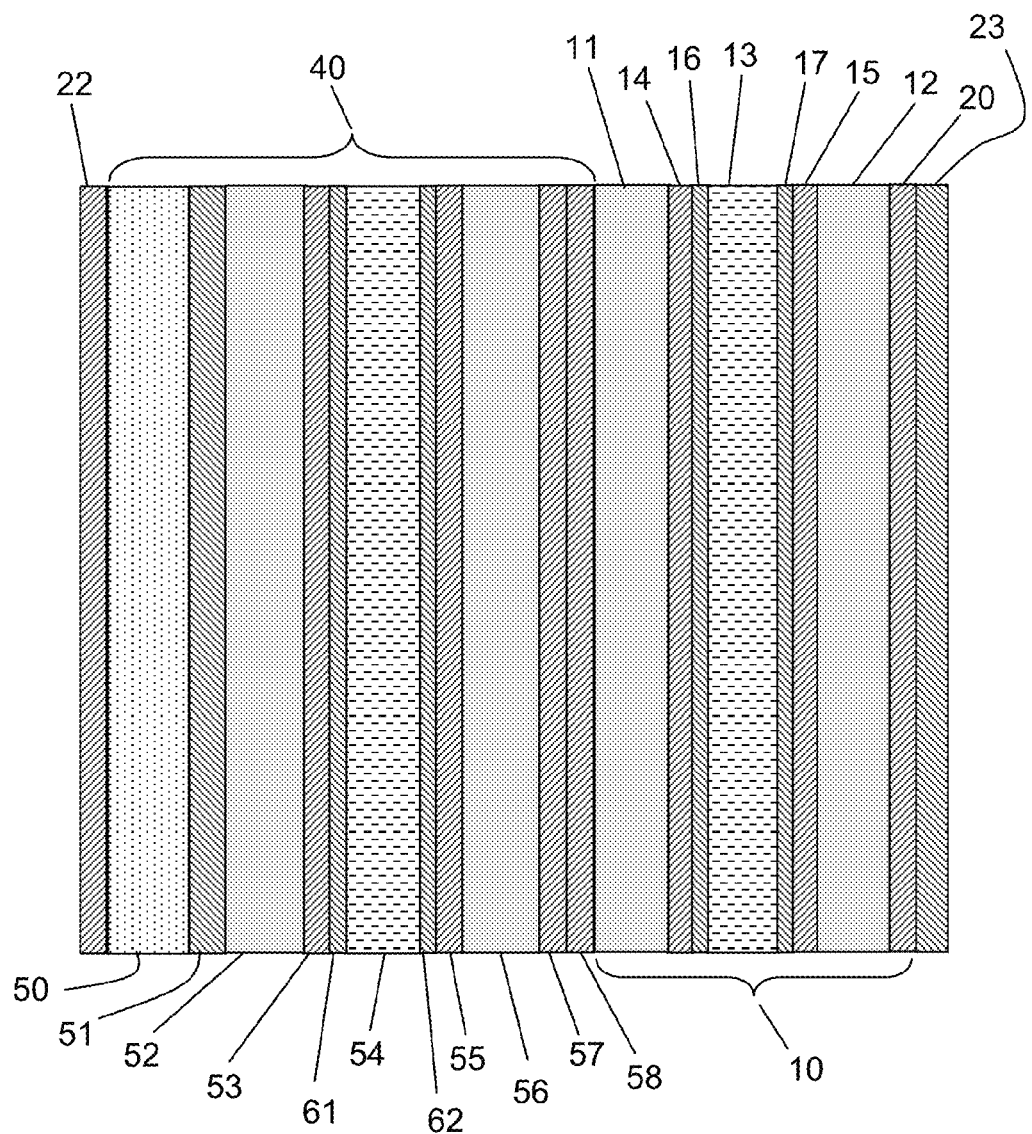
FIG. 6B is a cross-sectional drawing to illustrate that the example may have a layer (23) of absorptive polarizer placed in front of the layer (20) of reflective polarizer to prevent screen glaring of ambient lights.

In accordance with the invention, an example of the dual view convertible display, as illustratively shown in the drawing of FIGS. 5A and 5B, has view switch panel 10 attached to displaying surface of display 40 that is liquid crystal display. Because output lights of liquid crystal display is linearly polarized, view switch panel 10 in accordance with the example may include layer 21 of second polarizer as illustratively shown in the drawing of FIG. 5A, or, may not include layer 21 of second polarizer as illustratively shown in the drawing of FIG. 5B. For purpose hereof, display 40 should permit reflected lights passing through whole depth of the assembly of layers constituting functional layers of liquid crystal display, thus no backlight blank reflector to be included in the assembly. As illustratively shown in the drawing, display 40 in accordance with this example comprises following layers for liquid crystal display from left to right: backlight layer 50, first polarizer layer 51, first support substrate 52, first electrode layer 53 for control, liquid crystal layer 54, second electrode layer 55 for control, second support substrate 56, color filter layer 57, and second polarizer layer 58. Furthermore, guidance layers 61 and 62 for alignment of liquid crystal molecular may be presented respectively in between liquid crystal layer 54 and each of electrode layers 53 and 55. Electrode layers 53 and 55 and liquid crystal layer 54 optionally in conjunction with guidance layers 61 and 62 constitute polarization steering layer for image pixel matrix. In the drawing of FIG. 5B, view switch panel 10 not including layer 21 of second polarizer should be configured to work accordingly in consistent with polarization direction of linearly polarized lights outputted by display 40. Because no backlight blank reflector may be used to reflect backside leaking of lights from backlight layer 50 back toward first polarizer layer 51, design of backlight layer 50 minimizing backside leaking of lights is preferable. To prevent the backside leaking lights from backlight layer 50 from interfering back viewing experience of reflected displayed images, a layer 22 of absorptive polarizer having its polarization in parallel to the polarization of first polarizer layer 51 may be placed on back side of backlight layer 50, as illustratively shown in the drawing of FIG. 6A. With existence of layer 22 of absorptive polarizer, polarization portion of the backside leaking lights in perpendicular or orthogonal to polarization direction of layer 22 is absorbed thereby. Furthermore, layer 20 of reflective polarizer acting as front viewing surface of the duel view convertible display may also reflect ambient light, thus causing screen glaring. To prevent this problem of screen glaring, a layer 23 of absorptive polarizer having its polarization in parallel to the pass-through polarization of layer 20 may be attached to front surface of the dual view convertible display, as illustratively shown in the drawing of FIG. 6B. With the existence of layer 23, ambient lights is partially absorbed by the layer and the rest portion becomes linearly polarized to pass through subsequent layers of the dual view convertible display and eventually disappear without being reflected back.

It is to be recognized that control of the display system in accordance with the invention may be readily adapted from control of flat panel display with addition of capability to control the view switch panel embodied by the display system. Due to its simplicity on control requirement, the control for the view switch panel may be built with dedicated circuit or function expansion of the control of flat panel display. For example, for the function expansion way, the control for the view switch panel may use one I/O output or one DAC channel output of the control of flat panel display. For dedicated circuit way, the control for the view switch panel may use one I/O output or one DAC output connected to central controller of the control of the display system. The image data to be displayed by the display system may be transmitted through any video graphic interface that is useful for display, for example, VGA (Video Graphic Array), DVI (Digital Video Interface), or HEMI (High Definition Multimedia Interface). The control signal for the view switch panel of the display system may be transmitted through any data bus or dedicated data line or embedded in control data of the video graphic interface transmitting image data for displaying.

Figure 7A:
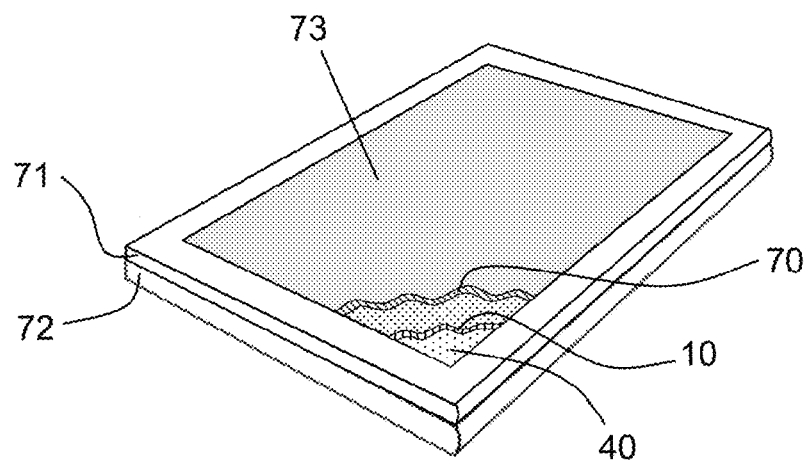
FIGS. 7A and 7B illustrates a portable computer having the dual view convertible display implemented as foldable display screen, which may be operated like a tablet computer with assistance of touch panel when the displace screen is folded down and operated like a regular laptop computer with assistance of onboard keyboard and touchpad when the display screen is opened upward.
Figure 7B:
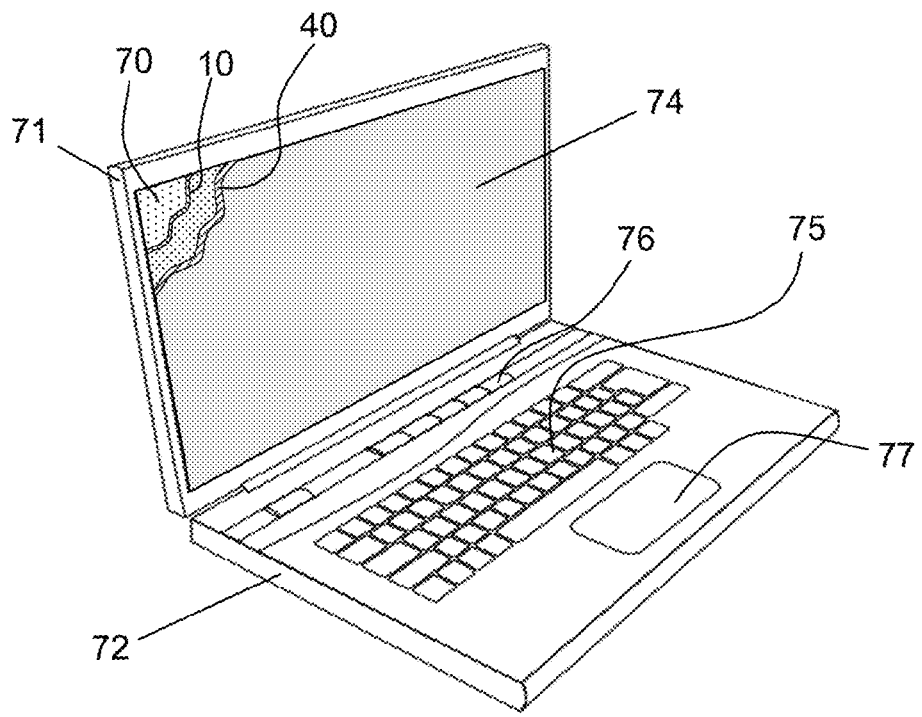

In accordance with the invention, a portable computing device may have the dual view convertible display implemented as foldable display screen, which makes the portable computing device operable no matter whether the display screen is folded down or opened upward upon user's preference. To do that, the dual view convertible display, having a first viewing side and a second viewing side in accordance with the invention, is configured to have the first viewing side in consistence with top surface of the foldable display screen and to have the second viewing side in consistence with bottom surface of the display screen, assuming the display screen is folded down. When the display screen is folded down, the dual view convertible display is controlled to have the first viewing side to output displayed images. When the display screen is opened upward, the dual view convertible display is controlled to output displayed images on the second viewing side. The portable computing device may have a touch panel placed atop the first viewing side for user interface inputs and an onboard keyboard incorporated underneath the folded display screen. The portable computing device may further have a pointing device such as touchpad or other computer-mice-like input device incorporated underneath the folded display screen. When the display screen is opened upward, the onboard keyboard is revealed for user access in operation and, if available, the pointing device as well. When the display screen is folded down, the touch panel permits user to operate the portable computing device by touching the top surface of the screen. The portable computing device may be any computing device that is made or adapted to be suitable for portable use. Typical examples of the portable computing device include cell phone, smart phone and portable or laptop computer. As illustratively shown in the drawings of FIGS. 7A and 7B, in accordance with the invention, a portable computer incorporating the dual view convertible display may help understand merits and teaching spirits of implementing the dual view convertible display on the portable computing device disclosed herein. The drawing of FIG. 7A illustrates scenario that the foldable display screen is folded down. In the drawing, the portable computer comprises a foldable display portion 71 embodying a dual view convertible display in accordance with the invention and a computing portion 72 embodying processor, memory, media storage, and peripherals for data processing and communication. Referring to cut-out showing portion in the drawing, the dual view convertible display comprises flat panel display 40 and view switch panel 10 and a touch panel 70 is placed on top of panel 10. The touch panel is adjacent top surface 73 of display portion 71, thus accessible by user when display portion 71 is folded in close position with computing portion 72. In the illustration, panel 10 is configured to be closer to top surface 73 than display 40. Display 40 prefer liquid crystal display for the technology maturity and the already widely spread use for portable computing device. In this illustrated scenario, the portable computer may be operated by displaying images through top surface 73 and receiving user's interface inputs through touch panel 70, similar as operational style of tablet computer or touch screen computer. In the case, the dual view convertible display embodied by display portion 71 is controlled to output images displayed by display 40 through top surface 73. The drawing of FIG. 7B illustrates scenario that the foldable display screen is opened upward. Referring to cut-out showing portion in the drawing, display 40 is adjacent bottom surface 74 of display portion 71 with view switch panel 10 and touch panel 70 sub-sequentially seen in the back. With display portion 71 in upward position, control console of computing portion 72 for user to operate the portable computer is revealed and available for user access. In accordance with showing of the drawing, the control console comprises a keyboard 75, a touchpad 77 and utility keys 76. In this illustrated scenario, the portable computer may be operated by displaying images through bottom surface 74 and receiving user's interface inputs through the control console, for example text inputs through keyboard 75 and mice-click-like inputs through touchpad 77. In the case, the dual view convertible display embodied by display portion 71 is controlled to output images displayed by display 40 through bottom surface 77. It is to be recognized that the dual view convertible display embodied by display portion 71 may have view switch panel 10 placed closer to bottom surface 74 than display 40, which is believed to work for the purpose hereof as well as the illustrated configuration shown in the drawings.

Figure 8:
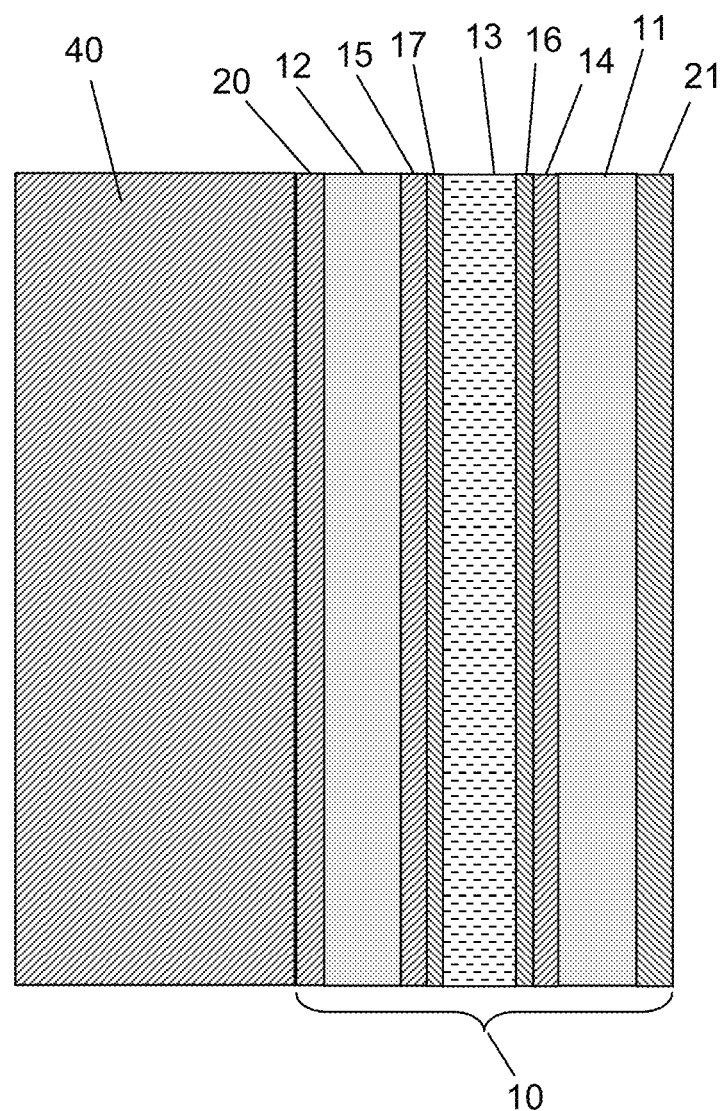
FIG. 8 is a cross-sectional drawing to illustratively show another display system, mirror view display, having a view switch panel in accordance with the invention placed in front of displaying surface of a flat panel display, which may be controlled to have its front surface viewed like mirror-like surface for reflecting ambient incidence lights or be controlled to have the front surface become unreflective to ambient incidence lights when displayed images are viewable through the front surface, in accordance with the invention.

In accordance with the invention, another display system implementing the view switch panel, mirror view display, has a view switch panel in accordance with the invention placed in front of displaying surface of a flat panel display. The mirror view display may be controlled to have its front surface viewed like mirror-like surface to reflect ambient incidence lights. When display function is in use, the mirror view display may be controlled to have the front surface become unreflective to ambient incidence lights. Thus, viewing displayed images will not suffer severe glaring from the front surface. When display function is not in use, changing the front surface to mirror-like surface permits the mirror view display to perform as a mirror. The view switch panel used in the mirror view display has a layer of absorptive polarizer presented as the layer of second polarizer, in accordance with the view switch panel disclosed previously in this disclosure. The layer of absorptive polarizer of the view switch panel constitutes the front viewing surface of the display system, which means the layer of reflective polarizer, on the other side of the view switch panel than the layer of absorptive polarizer, is adjacent the displaying surface of the display. In operation, when the view switch panel is set at transmission mode that permits ambient incidence lights to pass through, the front viewing surface becomes unreflective. When the view switch panel is set at reflection mode that reflects ambient incidence lights, the front viewing surface becomes reflective like a mirror. The flat panel display can be turned on through electronic control of the display when display function is in use and turned off when it is not desired so. When liquid crystal display is used as the flat panel display of the mirror view display, pass-through polarization of the layer of reflective polarizer should be configured in consistent with polarization of linearly polarized lights outputted by the liquid crystal display for the lights passing through. Furthermore, the mirror view display may work in a mode that both displayed images and mirrored image of nearby objects are viewable from front side, which may be useful to create special visual effect. However, due to difficult to combine display images and the mirrored image for one consistent visual effect, the mode may not present appreciable result without using very complex image processing mechanism, thus not viewed as primitive operational modes for the mirror view display. The mirror view display may be understood better by referring to illustration shown in the drawing of FIG. 8. As illustrative shown by the drawings of FIG. 8, view switch panel 10 is placed in front of a flat panel display 40. In engineering implementation of the display system, panel 10 and display 40 may be placed either in contact or in proximity unless intended purpose hereof is realized. View switch panel 10, as illustrated in the drawing, has layer 21 of absorptive polarizer included in the assembly thereof. Layer 20 of reflective polarizer of panel 10 is placed adjacent displaying surface of display 40. On the other side of the assembly of panel 10, layer 21 of absorptive polarizer constitutes front viewing surface of the mirror view display. If possible and desired by system design, layer 20 of reflective polarizer may be used as one functional layer of display 40, thus saving some cost of making.

Figure 9A:
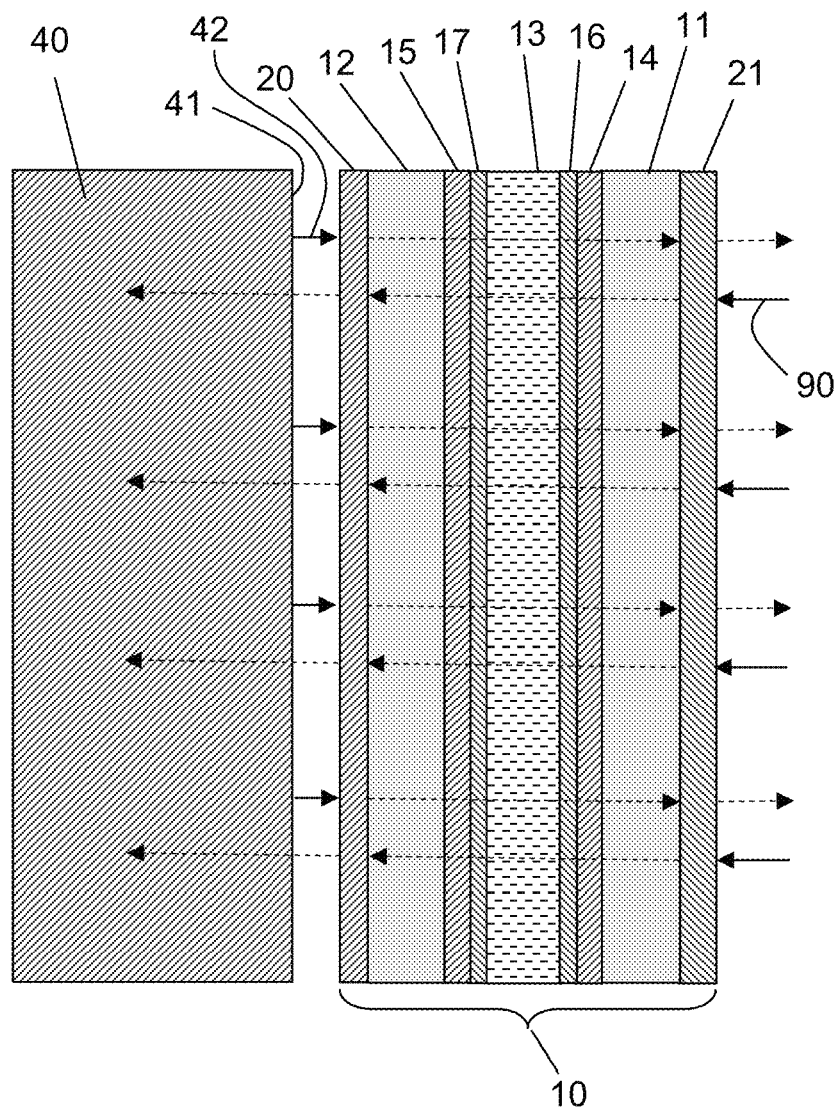
FIGS. 9A and 9B illustrates operations of the mirror view display as illustratively shown in the drawing of FIG. 8 for one polarization arrangement scheme of the view switch panel incorporated by the mirror view display.
Figure 9B:
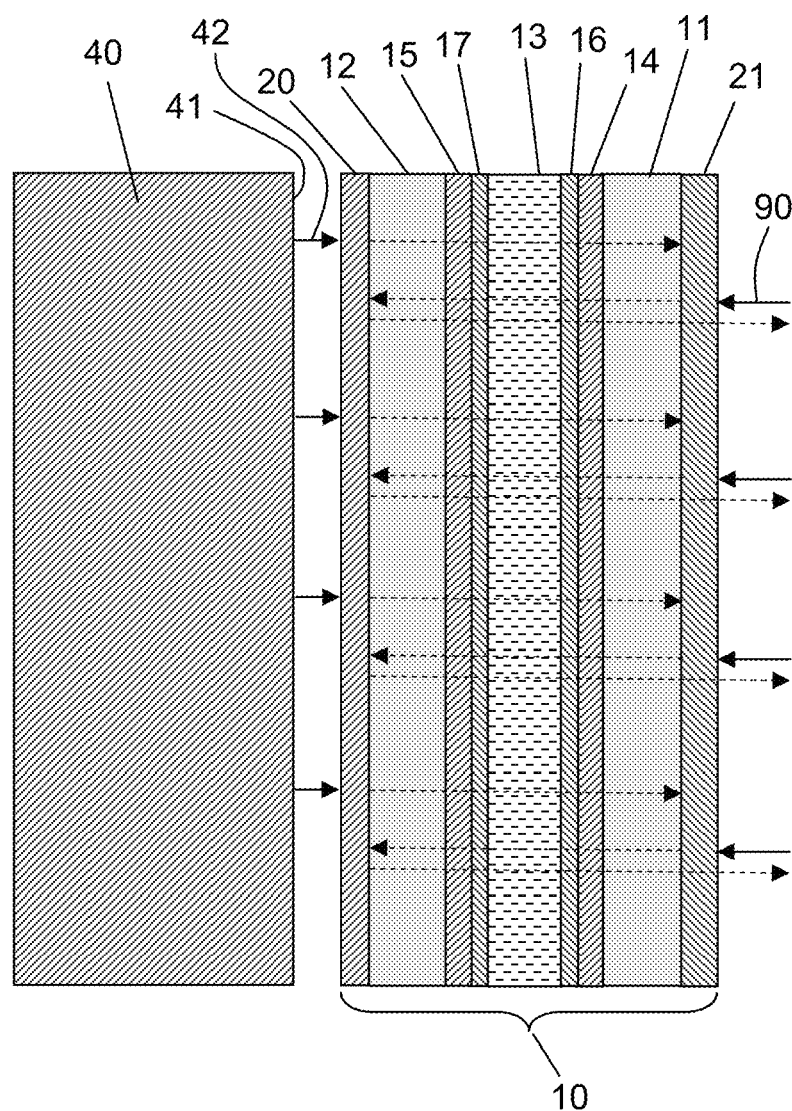

For the view mirror display, one possible polarization arrangement scheme for layers of view switch panel 10 is as following: pass-through polarization of layer 20 of reflective polarizer is orthogonal or perpendicular to polarization of layer 21 of absorptive polarizer; and, guiding directions of guidance layer 17 and 16 for aligning liquid crystal molecular are respectively consistent with the pass-through polarization of layer 20 and the polarization of layer 21. The thickness of layer 13 of liquid crystal is predetermined to rotate polarization of passing-through lights by 90 degree in plane perpendicular to beam direction. When no voltage is applied between electrode layers 15 and 14, lights 42 set forth from displaying surface 41 of display 40 entering at layer 20 and ambient lights 90 entering at layer 21 can pass through the assembly of panel 10, which is case as illustratively shown in the drawing of FIG. 9A. In the case, no screen glaring of ambient light occurs to interfere viewing of the displayed images. When a predetermined voltage is applied between electrode layers 15 and 14, which is case as illustratively shown in the drawing of FIG. 9B, lights 42, after going through layer 20 and the polarization steering layer as shown comprising layers 15,17, 13, 16 and 14, has its polarization perpendicular to polarization of layer 21, thus absorbed by layer 21. Ambient incidence lights 90, after going through layer 21 and the polarization steering layer, has its polarization perpendicular to pass-through polarization of layer 20 of reflective polarizer, thus reflected back by layer 20 and going outside of the assembly subsequently, similar as being reflected by mirror. It should be realized that portion of lights 90 may be absorbed by layer 21 when lights 90 first time passes through layer 21 to become linearly polarized. If ambient lights 90 is non-polarized, a perfect polarizer only permits 50 percent of lights passing through. Considering transmission of polarizer in real case, the reflected lights may be much dimmed by more than 50 percent comparing with the incidence lights. Because human eye has a strong capability to adapt to light intensity, the mirror-like effect achieved by the display system is believed to be still useful in thoroughly lightened environments. In some situations that ambient lights may be partially polarized, the reflection of the mirror-like effect can be enhanced by arranging polarization of layer 21 in consistent with polarization of the most significant polarization portion of the ambient lights. It is to be recognized that display 40 may be turned off to cut off output of lights 42 when the display is not wanted to display images, no matter whether view switch panel 10 is controlled to permit lights 42 passing through or not. Under this polarization arrangement scheme, the mirror view display enables front viewing surface acting like mirror when the predetermined voltage is applied to view switch panel 10. If the mirror-like front viewing surface is wanted to be enabled when no voltage is applied to panel 10, another polarization arrange scheme as described in immediately following paragraph may help achieve that.

Figure 10A:
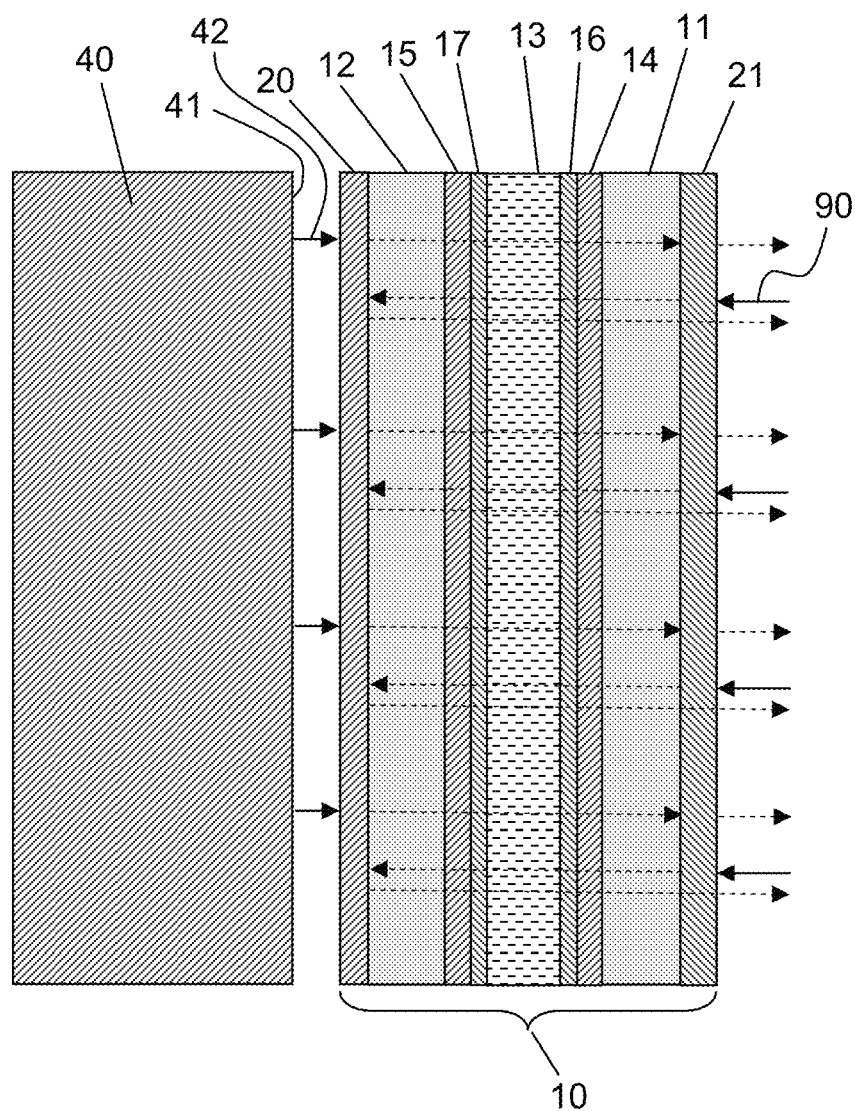
FIGS. 10A and 10B illustrates operations of the mirror view display as illustratively shown in the drawing of FIG. 8 for another polarization arrangement scheme of the view switch panel incorporated by the mirror view display.
Figure 10B:
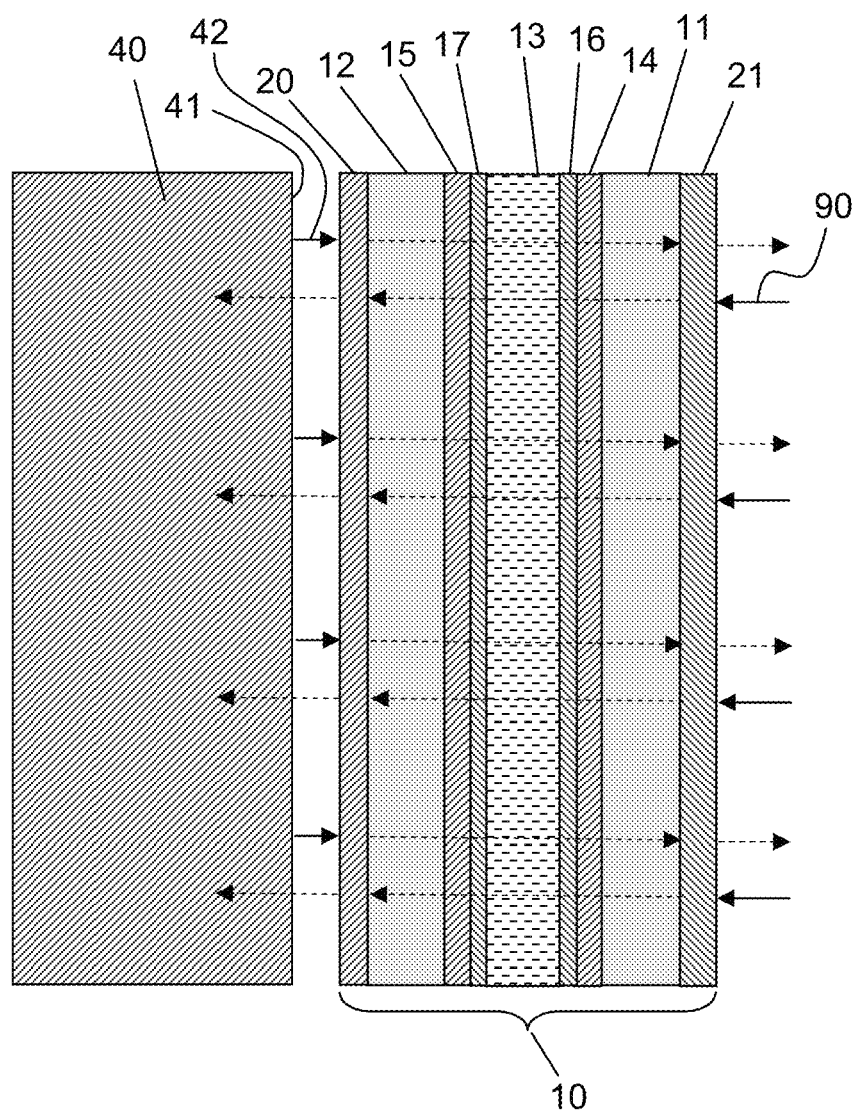

For the view mirror display, another possible polarization arrangement scheme for layers of view switch panel 10 is as following: pass-through polarization of layer 20 of reflective polarizer is parallel to polarization of layer 21 of absorptive polarizer; and, guiding direction of guidance layer 16 for aligning liquid crystal molecular is consistent with the polarization of layer 21 and guiding direction of guidance layer 17 is orthogonal or perpendicular to the guiding direction of guidance layer 16. The thickness of layer 13 of liquid crystal is predetermined to rotate polarization of passing-through lights incoming from layer 21 from polarization of layer 21 to orthogonal direction thereof. When no voltage is applied between electrode layers 14 and 15, which is case as illustratively shown in the drawing of FIG. 10A, ambient incidence lights 90 first passes through layer 21 to become linearly polarized, then, after going through the polarization steering layer as shown comprising layers 14, 16, 13, 17 and 15, is reflected by layer 20 of reflective polarizer, after that, goes through the polarization steering layer again, and finally passes through layer 21 again to return ambient. Lights 42 outputted from displaying surface 41 of display 40, after passing through layer 20 to become linearly polarized along pass-through polarization of the layer, may pass through the polarization steering layer without significant rotation on its polarization since its polarization is perpendicular to guiding direction of first encountered guidance layer 17 and in consistence with guiding direction of second encountered guidance layer 16. So lights 42 may pass through the assembly of view switch panel 10 to go outside front viewing surface of the display system. It is to be recognized that, if display 40 is not wanted to display images in the case, it should be turn off to cut off output lights 42 since lights 42 is not prevented from going outside in the case. In the case, front viewing surface of the mirror view display is enabled to behave like mirror-like surface when no voltage is applied on the view switch panel of the display system. When a predetermined voltage is applied between electrode layers 14 and 15 of view switch panel 10, which is case as illustratively shown in the drawing of FIG. 10B, ambient incidence lights 90 passes through the assembly of panel 10 and enters the assembly of display 40 without being reflected back by layer 20, and, lights 42 outputted by display 40 may still go outside front viewing surface of the display system. The predetermined voltage establishes an internal electrical field in layer 13 of liquid crystal to completely change original alignment distribution of liquid crystal molecular, thus no polarization rotation in effect. In the case, images displayed by display 40 may be viewable from front side of the mirror view display without suffering ambient light glaring. Under this polarization arrangement scheme, the mirror view display enables front viewing surface acting like mirror when no control voltage is applied to view switch panel 10. In the case, display 40 should be turned off when it is not desired to display images.

Figure 11A:
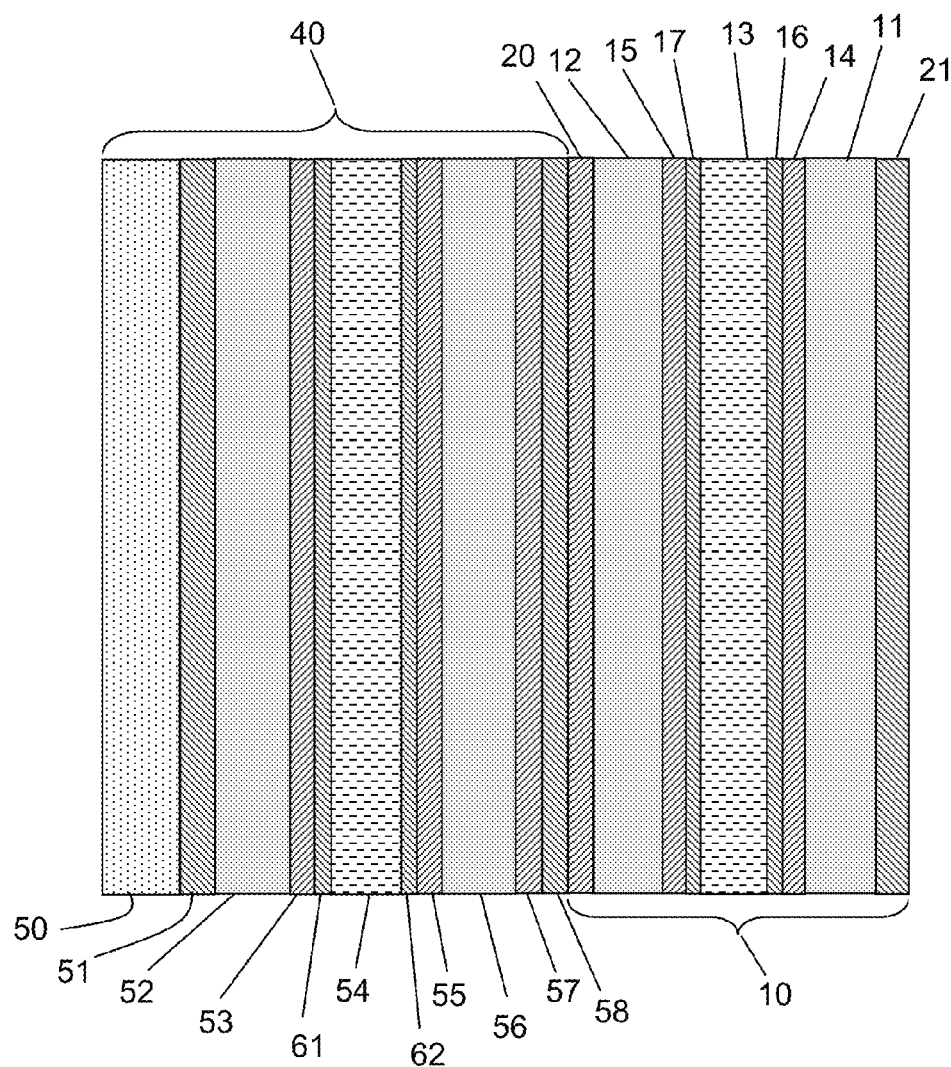
FIGS. 11A and 11B are cross-sectional drawings to illustrate an example of the mirror view display as illustratively shown in the drawing of FIG. 8, which uses liquid crystal display as the display for the display system.
Figure 11B:
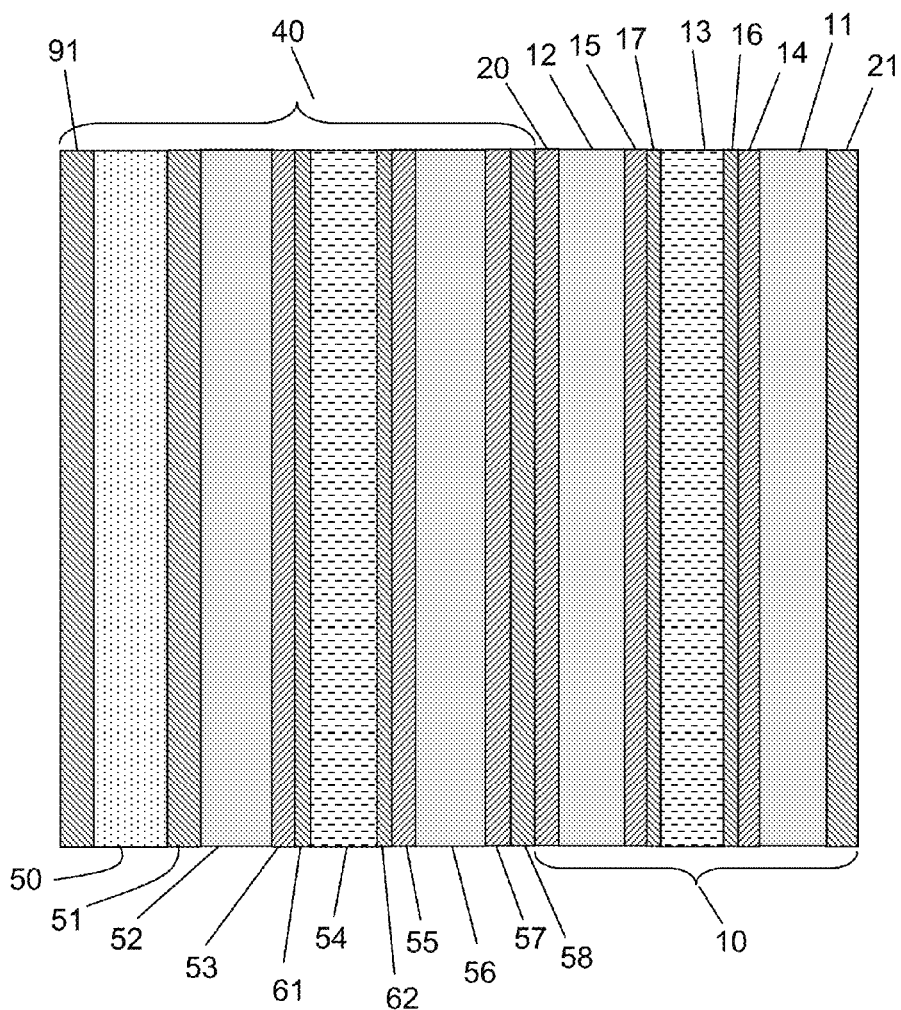

In accordance with the invention, an example of the mirror view display, as illustratively shown in the drawing of FIGS. 11A and 11B, has view switch panel 10 attached to displaying surface of display 40 that is liquid crystal display. Because output lights of liquid crystal display is linearly polarized, pass-through polarization of layer 20 is configured in consistence with polarization of the output lights, which is determined by polarization of second polarizer layer 58. As illustratively shown in the drawing of FIG. 11A, display 40 in accordance with this example comprises following layers for liquid crystal display from left to right: backlight layer 50, first polarizer layer 51, first support substrate 52, first electrode layer 53 for control, liquid crystal layer 54, second electrode layer 55 for control, second support substrate 56, color filter layer 57, and second polarizer layer 58. Furthermore, guidance layers 61 and 62 for alignment of liquid crystal molecular may be presented respectively in between liquid crystal layer 54 and each of electrode layers 53 and 55. Electrode layers 53 and 55 and liquid crystal layer 54 optionally in conjunction with guidance layers 61 and 62 constitute polarization steering layer for image pixel matrix. It is to be recognized that function of second polarizer layer 58 may be substituted by layer 20 of reflective polarizer, thus layer 58 may be removed to save cost of making if desired to do so. As illustrative shown in the drawing of FIG. 11B, a reflection layer made of metal may be placed on back side of backlight layer 50 to reflect backward leaking lights of layer 50 toward first polarizer layer 51 to become usable for backlighting of liquid crystal display.

Figure 12A:
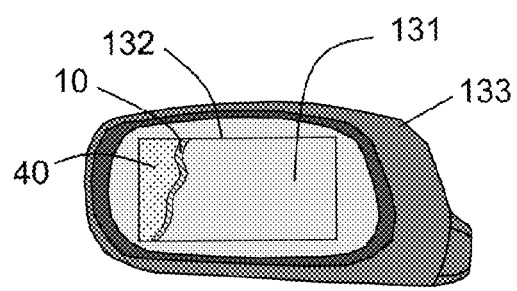
FIGS. 12A, 12B, and 12C illustrates several examples of rear view assembly for automobile having a mirror view display in accordance with the invention embodied thereon for rear viewing, which may work like mirror for rear view in daylight and display images captured by digital camera onboard automobile for rear view at night or in low light environments such as twilight, vision impaired weathers at day time including fog, cloudy, raining and snowing.
Figure 12B:
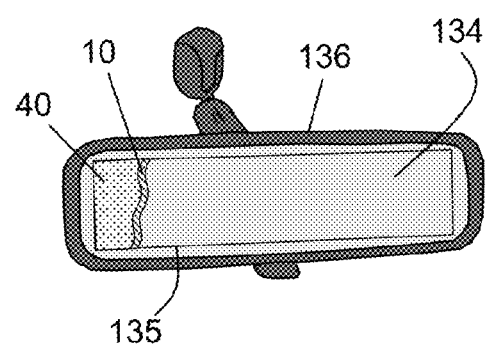
Figure 12C:
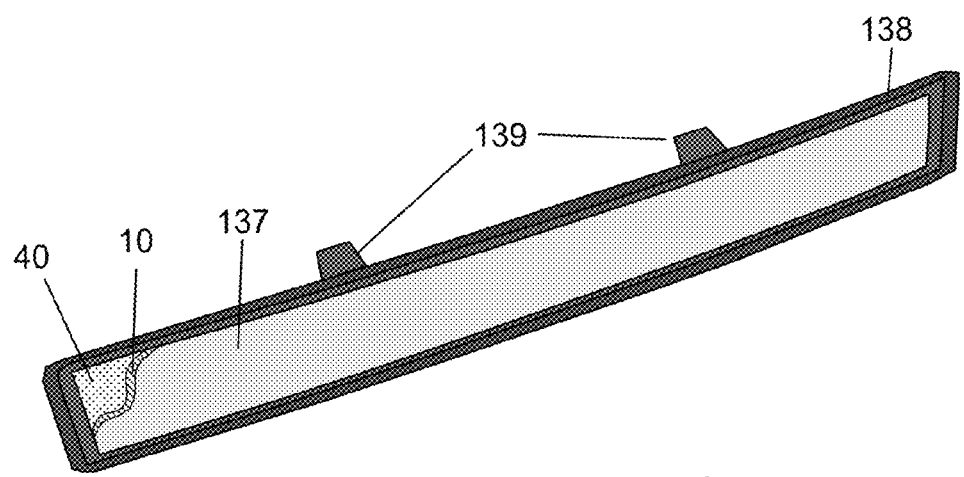

In accordance with the invention, a rear view assembly for automobile may embody a mirror view display in accordance with the invention, which works like mirror for rear view in daylight and displays images captured by digital camera onboard automobile for rear view at night or in low light environments such as twilight, vision impaired weathers at day time including fog, cloudy, raining and snowing. As illustratively shown in the drawing of FIG. 12A, an example of the rear view assembly is similar as a side mounted rear view mirror of automobile. In the drawing, due to irregular shape of frame body 133 of the rear view assembly, the mirror view display embodied thereby has its front viewing surface acted as at least portion of rear view surface 131 of the rear view assembly, which is illustratively represented by area enclosed by rectangle 132. The rest portion of rear view surface 131 outside rectangle 132 may be coated with reflective metal to work as a regular mirror. As shown by cut-out showing portion in the drawing, view switch panel 10 of the mirror view display is adjacent rear view surface 131 and display 40 of the mirror view display is placed in the back of panel 10. When mirror-like surface for rear view is desired at daylight, the mirror view display embodied by the rear view assembly is controlled to enable its front viewing surface acting like mirror. When rear view using digital camera onboard automobile is desired at night or in low light environments, the mirror view display embodied by the rear view assembly is configured to display images captured by the digital camera through its front viewing surface. In the case, panel 10 is controlled not to reflect ambient incidence lights in order to get rid of glaring, which otherwise may impair viewing of the displayed images. As illustratively shown in the drawing of FIG. 12B, another example of the rear view assembly is similar as a center mounted rear view mirror of automobile. In the drawing, due to irregular shape of frame body 136 of the rear view assembly, the mirror view display embodied thereby has its front viewing surface acted as at least portion of rear view surface 134 of the rear view assembly, which is illustratively represented by area enclosed by rectangle 135. The rest portion of rear view surface 134 outside rectangle 135 may be coated with reflective metal to work as a regular mirror. As shown by cut-out showing portion in the drawing, view switch panel 10 of the mirror view display is adjacent rear view surface 134 and display 40 of the mirror view display is placed in the back of panel 10. As illustratively shown in the drawing of FIG. 12C, another example of the rear view assembly is similar as a center mounted wide rear view mirror having very broad viewing scope. Because the rear view assembly has a nearly rectangular frame body 138, it is possible to have front viewing surface of the mirror view display embodied thereby acted as full area of rear view surface 137. As shown by cut-out showing portion in the drawing, view switch panel 10 of the mirror view display is adjacent rear view surface 137 and display 40 of the mirror view display is placed in the back of panel 10. In the case, because rear view surface 137 is wide enough to accommodate a much broader rear view, it may be necessary to, using state-of-art image processing techniques, seamlessly stitch images captured by more than one digital cameras onboard automobile to form a wide view image subsequently displayed on display 40 of the mirror view display. Because frame body 138 is long in length, it may need to have two mounting fixture 139 or more on the body frame for securely mounting inside automobile, near upper edge of windshield on windshield or cabin roof in order to provide driver best rear viewing experience. For the rear view assembly, liquid crystal display is preferred as display 40 of the mirror view display embodied thereby. The rear view assembly may include necessary control electronics to drive working of the mirror view display embodied thereby. Furthermore, the rear view assembly is connected to onboard electronics of automobile for receiving image data for displaying and for automatic switching between mirror-like view and displayed view upon time and ambient lighting condition. Digital camera onboard automobile prefers being installed to capture rear view scene as much consistent with mounting location of the rear view assembly on automobile as possible. For displaying broad rear view, a plurality of digital camera may be arranged to have their capturing views consistent with one another in order to form a seamless broad view.

It is to be recognized that the assembly of layers for liquid crystal display illustratively shown in the drawings of this disclosure is only one or few examples of possible configurations of liquid crystal display that may be used in the display system in accordance with the invention, for purpose to illustrate merits and teaching spirits of the invention disclosed in this disclosure, and, should not be taken as any suggestion or hint to treat the example or examples as exclusive configuration of liquid crystal display applicable to the invention. It is emphasized that any configuration of liquid crystal display without conflicting merits and teaching spirits of the invention disclosed in this disclosure may be used in the display systems in accordance with the invention by ordinary skilled personnel in related art upon enlightenments of the merits and teaching spirits of the invention.

It should be understood that embodiments disclosed are only a few examples of possible implementations of the invention disclosed in the disclosure and their teachings may be used by ordinary skilled in related art to modify the embodiments or derive from the embodiments to form embodiment appearing not similar as the embodiments but still utilizing true merit and teaching spirit of the invention. Therefore, if any, the modification or derivation is still within the scope of the invention and all related rights are reserved.

I claim:

1. A display system comprising:
   a flat panel display having a displaying surface, a back surface opposing said displaying surface and a transparent body; and
   a view switch panel placed in front of said displaying surface of said flat panel display, comprising:
   a reflective polarizer layer placed upon said displaying surface; and
   a polarization steering layer placed in between said displaying surface and said reflective polarizer layer, which comprises two electrode layers opposing each other and a layer of liquid crystal placed in between said two electrode layers;
   whereby, in operation, lights set forth from said displaying surface is observed from outer side of said reflective polarizer layer when said lights is steered by said polarization steering layer to pass through said reflective polarizer layer, and is observed from said back surface when said lights is steered by said polarization steering layer to be reflected by said reflective polarizer layer.

2. The display system in accordance with claim 1 wherein said flat panel display is a liquid crystal display having a backlight layer presented in the assembly of said liquid crystal display without having a backlight reflector on back side of the backlight layer.

3. The display system in accordance with claim 2 further comprises a layer of absorptive polarizer placed on back side of said backlight layer.

4. The display system in accordance with claim 1 wherein said view switch panel further comprises a layer of second polarizer placed between said display surface and said polarization steering layer.

5. The display system in accordance with claim 4 wherein said view switch panel is configured to have said layer of second polarizer adjacent said displaying surface.

6. A display system comprising:
   a liquid crystal display having a displaying surface, a back surface opposing said displaying surface and a transparent body; and
   a view switch panel placed in front of said displaying surface of said liquid crystal display, comprising:
   a reflective polarizer layer placed upon said displaying surface; and
   a polarization steering layer placed in between said displaying surface and said reflective polarizer layer, which comprises two electrode layers opposing each other and a layer of liquid crystal placed in between said two electrode layers;
   whereby, in operation, lights set forth from said displaying surface is observed from outer side of said reflective polarizer layer when said lights is steered by said polarization steering layer to pass through said reflective polarizer layer, and is observed from said back surface when said lights is steered by said polarization steering layer to be reflected by said reflective polarizer layer.

7. The display system in accordance with claim 6 wherein said liquid crystal display has a backlight layer presented in the assembly of said liquid crystal display without having a backlight reflector on back side of said backlight layer.

8. The display system in accordance with claim 7 further comprises a layer of absorptive polarizer placed on back side of said backlight layer.

9. The display system in accordance with claim 6 wherein said view switch panel further comprises a layer of second polarizer placed between said display surface and said polarization steering layer.

10. The display system in accordance with claim 9 wherein said view switch panel is configured to have said layer of second polarizer adjacent said displaying surface.

* * * * *